US011398915B2

(12) United States Patent
Morrison

(10) Patent No.: US 11,398,915 B2
(45) Date of Patent: Jul. 26, 2022

(54) APPARATUS AND METHOD FOR TWO-WAY AUTHENTICATION

(71) Applicant: Samsung Electronics Co., Ltd., Suwon-si (KR)

(72) Inventor: John S. Morrison, Mountain View, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 172 days.

(21) Appl. No.: 15/248,723

(22) Filed: Aug. 26, 2016

(65) Prior Publication Data

US 2018/0063709 A1 Mar. 1, 2018

(51) Int. Cl.

| | |
|---|---|
| ***H04L 29/06*** | (2006.01) |
| ***H04L 9/32*** | (2006.01) |
| ***H04L 9/06*** | (2006.01) |
| ***H04L 9/08*** | (2006.01) |
| ***H04L 9/40*** | (2022.01) |
| ***H04W 12/041*** | (2021.01) |
| ***H04W 12/062*** | (2021.01) |
| ***H04W 12/06*** | (2021.01) |
| ***H04W 12/069*** | (2021.01) |

(52) U.S. Cl.

CPC .......... *H04L 9/3239* (2013.01); *H04L 9/0643* (2013.01); *H04L 9/0861* (2013.01); *H04L 9/3236* (2013.01); *H04L 63/061* (2013.01); *H04L 63/0869* (2013.01); *H04W 12/041* (2021.01); *H04W 12/062* (2021.01); *H04W 12/068* (2021.01); *H04W 12/069* (2021.01)

(58) Field of Classification Search

CPC ... H04W 12/06; H04W 12/04; H04W 12/069; H04W 12/062; H04W 12/041; H04W 12/068; H04L 9/0643; H04L 9/0861; H04L 63/0869; H04L 9/3236; H04L 63/06; H04L 9/3239; H04L 63/061; H04L 2209/38

See application file for complete search history.

(56) References Cited

U.S. PATENT DOCUMENTS

| | | | | |
|---|---|---|---|---|
| 6,556,819 | B2 | 4/2003 | Irvin | |
| 8,788,804 | B2 | 7/2014 | Nagaraja | |
| 9,027,076 | B2 | 5/2015 | Roach et al. | |
| 9,171,306 | B1 * | 10/2015 | He | G06Q 20/405 |
| 9,727,747 | B1 * | 8/2017 | Kim | H04L 63/102 |

(Continued)

OTHER PUBLICATIONS

Jakobsson et al "Implicit authentication for mobile devices" Aug. 2009, In Proceedings of the 4th USENIX conference on Hot topics in security, p. 1-6.*

*Primary Examiner* — Harunur Rashid

(57) ABSTRACT

A method of an enterprise server for performing two-way authentication with a mobile device in a network is provided. The method includes receiving, by an enterprise server of the network, a user context record (UCR) generated by the mobile device when the mobile device initiates a connection request to the network; calculating, by the enterprise server, an authenticity score based on the received UCR; validating, by the enterprise server, the authenticity of the mobile device based on the authenticity score; and generating and transmitting, by the enterprise server, an information to the mobile device for the mobile device to validate the authenticity of the enterprise server based on the transmitted information.

28 Claims, 38 Drawing Sheets

(56) References Cited

U.S. PATENT DOCUMENTS

| | | | | |
|---|---|---|---|---|
| 2007/0220253 | A1* | 9/2007 | Law | G06F 21/445 713/168 |
| 2014/0281506 | A1* | 9/2014 | Redberg | H04L 63/10 713/159 |
| 2014/0344128 | A1* | 11/2014 | Nikankin | G06Q 40/00 705/35 |
| 2015/0188949 | A1* | 7/2015 | Mahaffey | H04W 12/37 726/1 |
| 2015/0222619 | A1* | 8/2015 | Hughes | H04L 63/08 713/168 |
| 2015/0278598 | A1* | 10/2015 | Scott | H04L 9/3239 382/100 |
| 2015/0310196 | A1* | 10/2015 | Turgeman | G06F 3/04842 726/19 |
| 2016/0180068 | A1* | 6/2016 | Das | G06F 21/32 726/7 |
| 2017/0300919 | A1* | 10/2017 | Chen | G06F 21/552 |

* cited by examiner

| DATA STRUCTURE | COMMENTS |
|---|---|
| <MESSAGE TYPE: EPC> | IDENTIFIES THE TYPE OF MESSAGE |
| <FORMAT VERSION> | IF THE FORMAT IS KNOWN, THEN NO DATA LABELING NEEDED |
| <TIME STAMP> | IF MODIFIED, THE ENCRYPTED DATA BLOB WON'T DECRYPT |
| <CONTEXT AUTHENTICATION> | THIS IS AN INTERIOR HASH FROM THE LAST SESSION TREE. IT PROVES THE IDENTITY OF BOTH THE PLATFORM AND THE USER. IF MODIFIED, THE ENCRYPTED DATA BLOB WON'T DECRYPT. |
| <DELIMITER> | MARKS THE START OFTHE ENCRYPTED BLOB |
| <ENCRYPTED DATA BLOB> | CONTAINS THE PRIMARY MESSAGE PAYLOAD ABOUT CONTEXT |
| <MESSAGE TERMINATOR> | MARKS END OF MESSAGE |

FIG. 10

| | UCR-1 | UCR-2 | UCR-3 |
|---|---|---|---|
| UCR-1 | 0 | 14 | 75,317.3 |

FIG. 29A

| | UCR-1 | UCR-2 | UCR-3 |
|---|---|---|---|
| UCR-1 | 0 | 0 | 1 |

FIG. 29B

| UCR-1 | UCR-2 | UCR-3 |
|---|---|---|
| 162.246.216.28 | 162.246.216.28 | 64.233.160.1 |

FIG. 30A

| UCR-1 | UCR-2 | UCR-3 |
|---|---|---|
| 0 | 0 | 1 |

FIG. 30B

| UCR-1 | UCR-2 | UCR-3 |
|---|---|---|
| 0.8 | 0.4 | 0.9 |

FIG. 31A

| UCR-1 | UCR-2 | UCR-3 |
|---|---|---|
| 0 | 1 | 0 |

FIG. 31B

| UCR-1 | UCR-2 | UCR-3 |
|---|---|---|
| 2 | 3 | 5 |

FIG. 32A

| UCR-1 | UCR-2 | UCR-3 |
|---|---|---|
| 1 | 0 | 0 |

FIG. 32B

TRANSFORMED UCR VALUES

| UCR-1 | UCR-2 | UCR-3 |
|---|---|---|
| 0 | 0 | 1 |
| 0 | 0 | 1 |
| 0 | 1 | 0 |
| 1 | 0 | 0 |
| 0 | 0 | 0 |

FIG. 34A

HAMMING DISTANCE (h) FROM UC

| | UCR-1 | UCR-2 | UCR-3 |
|---|---|---|---|
| | 0 | 0 | 1 |
| | 0 | 0 | 1 |
| | 0 | 1 | 0 |
| | 0 | 1 | 1 |
| | 0 | 0 | 0 |
| 'h' = | 0 | 2 | 3 |

FIG. 34B

| FACTOR | WEIGHT | DISTANCE | | FACTOR RISK SCORE |
|---|---|---|---|---|
| LOCATION | 0.5 | 0 | = | 0.0 |
| NETWORK | 0.1 | 0 | = | 0.0 |
| BIOMETRIC | 0.2 | 1 | = | 0.2 |
| DAY | 0.1 | 1 | = | 0.1 |
| TIME | 0.1 | 0 | = | 0.0 |
| | SUM OF WEIGHTS 1.0 | 2 HAMMING DISTANCE | | 0.3 TOTAL RISK SCORE IS SUM OF WEIGHTED FACTOR RISKS |

FIG. 35

APPARATUS AND METHOD FOR TWO-WAY AUTHENTICATION

CROSS-REFERENCE TO RELATED APPLICATION(S)

This application claims the benefit under 35 U.S.C. § 119(e) of a U.S. Provisional application filed on Sep. 17, 2015 in the U.S. Patent and Trademark Office and assigned Ser. No. 62/220,141, a U.S. Provisional application filed on Sep. 17, 2015 in the U.S. Patent and Trademark Office and assigned Ser. No. 62/220,164, a U.S. Provisional application filed on Jan. 15, 2016 in the U.S. Patent and Trademark Office and assigned Ser. No. 62/279,167, and a U.S. Provisional application filed on Apr. 11, 2016 in the U.S. Patent and Trademark Office and assigned Ser. No. 62/321,095, the entire disclosure of each of these application is hereby incorporated by reference.

TECHNICAL FIELD

The present disclosure relates to an apparatus and method for two-way authentication between a mobile device and a network. More particularly, the present disclosure relates to an apparatus and method that provides two-way risk assessment for connecting a user of a mobile device to an enterprise network and the enterprise network to the user of the mobile device based on current and past user context measurements.

BACKGROUND

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), games, remote control of short range communication, an image capturing function using a mounted digital camera, a multimedia function for providing audio and video content, a scheduling function, and many more. With the plurality of features now provided, a mobile terminal has effectively become a necessity of daily life.

With the proliferation of mobile terminal, users are increasingly using the mobile terminals to access enterprise networks, for example, via Bluetooth, 3G/4G or LTE networks. This may bring risks to enterprise information security. The openness of the mobile networks increases the possibility of malicious attacks against the enterprise network. The users with weak passwords may also pose risk to data and information on the enterprise networks.

Traditional methods of authentication rely on passwords, credentials, tokens, biometrics or gestures that enable access to sensitive information or networks based on one or more simultaneous tests that, when complete, allow unfettered access.

The U.S. Government has recognized the weakness of user names and passwords for authenticating the end user and has mandated a phase-out of these methods. Digital certificates can provide a stronger approach to attestation for the user's computer, but do not guarantee authenticity of the user.

Credit card companies have learned that "passing a test" which requires a card and knowledge of a PIN, does not guarantee authenticity. Sophisticated credit card companies now use context information such as location, transaction type and transaction amount as supplemental evidence of authenticity. They use context to measure risk in a more nuanced way, and determine whether the risk is small enough, or the context is close enough, to enable a transaction.

Organizations which handle highly sensitive or highly valuable data have learned that "passing the test" provides no guarantee that a human or machine will operate within guidelines for "normal" or "cyber-safe" behavior.

Passing an authentication test will not reveal whether the network actor is the same one that previously passed the test, since human and device identities can be spoofed.

Finally, "passing the test" lets you in the door, but does not address the problems of encryption or data leakage. These are separate processes requiring their own resources.

Accordingly, there is a need for an apparatus and method for providing an improved two-way authentication of user-to-enterprise and enterprise-to-user to replace or supplement user names and passwords.

SUMMARY

Aspects of the present disclosure are to address at least the above-mentioned problems and/or disadvantages and to provide at least the advantages described below. Accordingly, an aspect of the present disclosure is to provide an apparatus that provides two-way risk assessment for connecting a user of a mobile device to an enterprise network and the enterprise network to the user of the mobile device based on current and past user context measurements.

In accordance with an aspect of the present disclosure, an enterprise server for performing two-way authentication with a mobile device in a network is provided. The enterprise server includes a memory, and at least one processor, coupled to the memory, configured to receive a user context record (UCR) generated by the mobile device, calculate an authenticity score based on the received UCR, validate the authenticity of the mobile device based on the authenticity score, and generate and transmit an information to the mobile device for the mobile device to validate the authenticity of the enterprise server based on the transmitted information.

In accordance with an aspect of the present disclosure, a method of an enterprise server for performing two-way authentication with a mobile device in a network is provided. The method includes receiving, by an enterprise server of the network, a user context record (UCR) generated by the mobile device when the mobile device initiates a connection request to the network, calculating, by the enterprise server, an authenticity score based on the received UCR, validating, by the enterprise server, the authenticity of the mobile device based on the authenticity score, and generating and transmitting, by the enterprise server, an information to the mobile device for the mobile device to validate the authenticity of the enterprise server based on the transmitted information.

In accordance with an aspect of the present disclosure, a mobile device for performing two-way authentication with an enterprise server in a network is provided. The mobile device includes a memory, and at least one processor, coupled to the memory, configured to initiate a connection request to the enterprise server, generate a user context record (UCR) when the connection request is initialized, transmit the UCR to the enterprise server, receive an information from the enterprise server, and validate the authenticity of the enterprise server based on the information received.

In accordance with another aspect of the present disclosure, a method of a mobile device for performing two-way authentication with an enterprise server in a network. The method includes initiating a connection request to the enterprise server, generating, by a mobile device, a user context record (UCR) when the connection request to the network, transmitting, by the mobile device, the UCR to the enterprise server, receiving, by the mobile device, an information from the enterprise server, and validating, by the mobile device, the authenticity of the enterprise server based on the information received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of various embodiments of the present disclosure will be more apparent from the following description taken in conjunction with the accompanying drawings, in which:

FIG. 10 illustrates a message schema that communicates continuity and context information to the enterprise according to an embodiment of the present disclosure;

FIGS. 29A to 29B illustrate an example of UCR analysis based on geographic distance according to various embodiments of the present disclosure;

FIGS. 30A to 30B illustrate an example of UCR analysis based on network distance according to various embodiments of the present disclosure;

FIGS. 31A to 31B illustrate an example of UCR analysis based on biometric distance according to various embodiments of the present disclosure;

FIGS. 32A to 32B illustrate an example of UCR analysis based on day of the week according to various embodiments of the present disclosure;

FIGS. 34A to 34B illustrate an example of Hamming distance analysis according to various embodiments of the present disclosure;

FIG. 35 illustrates an example of weighted score analysis with respect to the closest UCR match according to an embodiment of the present disclosure;

Throughout the drawings, it should be noted that like reference numbers are used to depict the same or similar elements, features, and structures.

DETAILED DESCRIPTION

Figure 1:
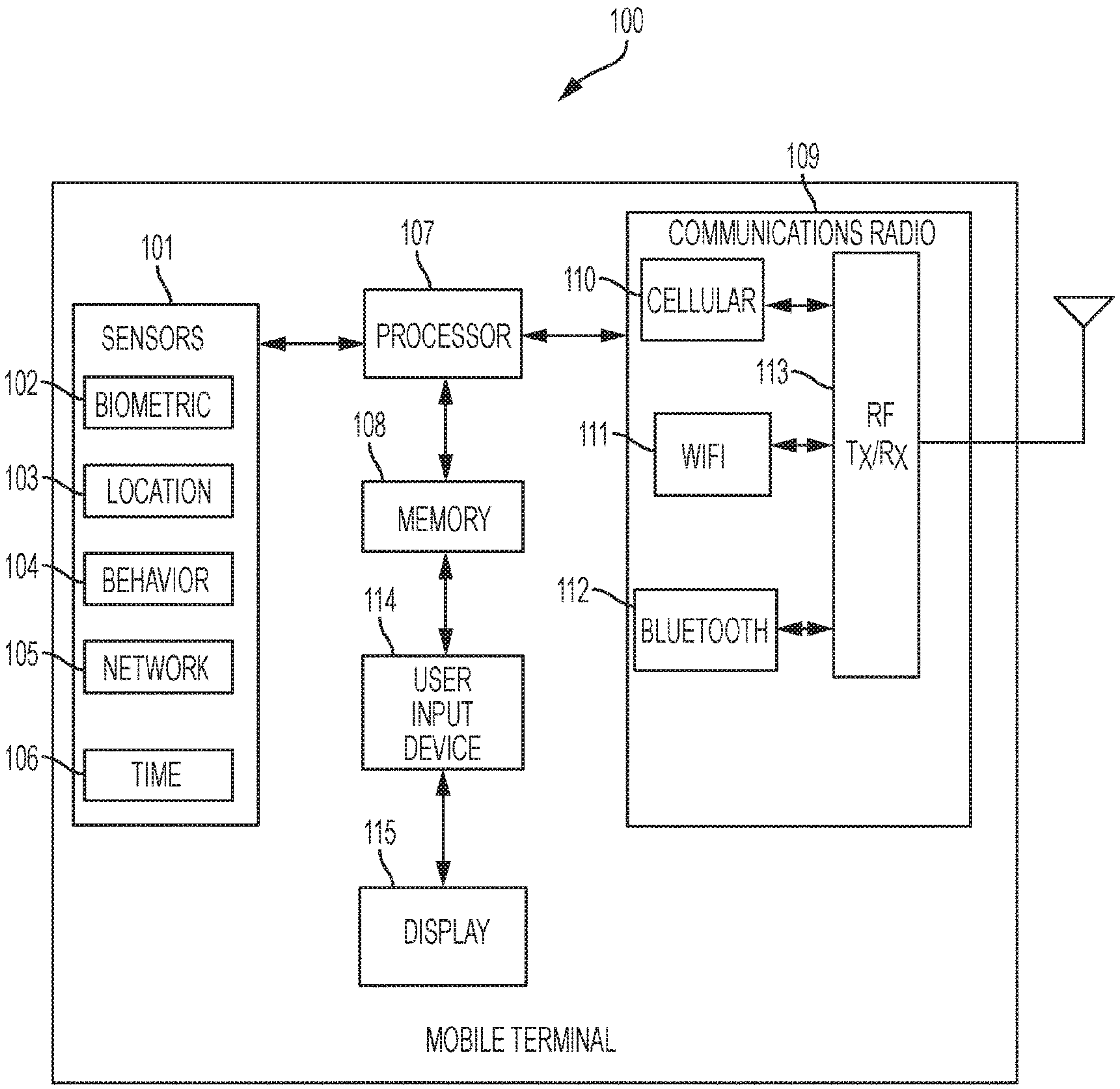
FIG. 1 illustrates a block diagram of a mobile device according to embodiment of the present disclosure.

Detailed descriptions of various aspects of the present disclosure will be discussed below with reference to the attached drawings. The descriptions are set forth as examples only, and shall not limit the scope of the present disclosure.

The detailed description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure are provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined differently, all terms used in the present disclosure, including technical or scientific terms, have meanings that are understood generally by a person having ordinary skill in the art. Ordinary terms that may be defined in a dictionary should be understood to have the meaning consistent with their context, and unless clearly defined in the present disclosure, should not be interpreted to be excessively idealistic or formalistic.

According to various embodiments of the present disclosure, a mobile device/terminal may include communication functionality. For example, a mobile terminal may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an MP3 player, a mobile medical device, a camera, a wearable device (e.g., a Head-Mounted Device (HMD), electronic clothes, electronic braces, an electronic necklace, an electronic accessory, an electronic tattoo, or a smart watch), and/or the like.

According to various embodiments of the present disclosure, a mobile device may be a navigation device, a Global Positioning System (GPS) receiver, an automotive infotainment device, a naval electronic device (e.g., naval navigation device, gyroscope, or compass), an avionic electronic device, a security device, an industrial or consumer robot, and/or the like.

According to various embodiments of the present disclosure, a mobile terminal may be any combination of the foregoing devices. In addition, it will be apparent to one having ordinary skill in the art that a mobile terminal according to various embodiments of the present disclosure is not limited to the foregoing devices.

According to various embodiments of the present disclosure, an enterprise network may be a public network or a private network. It may be a local area network (LAN), a metropolitan area network (MAN) or a wide area network (WAN) such as an internet and/or the like.

According to various embodiments of the present disclosure, an enterprise network may be any combination of the foregoing networks. In addition, it will be apparent to one having ordinary skill in the art that an enterprise network according to various embodiments of the present disclosure is not limited to the foregoing networks.

Various embodiments of the present disclosure include a two-way authentication apparatus and method for establishing a connection between a mobile device and a network such as an enterprise network.

Multi-functional mobile devices have the sensors and processing power to identify end users by context such as biometric context, location context, and/or behavioral context. Efficient context-processing algorithms and data structures make the approach feasible for mobile devices. Various embodiments of the present disclosure include a two-way authentication apparatus and method to replace or supplement user names and passwords.

In particular, the apparatus and method according to various embodiments of the present disclosure provides two-way risk assessment of User-to-Enterprise and Enterprise-to-User based on current and past user context measurements. The enterprise server 2 validates the user based on a risk score, and the mobile device 1 validates the authenticity of the enterprise server based on one-time receipt of information about a prior connection.

FIG. 1 illustrates a block diagram of a mobile device according to an embodiment of the present disclosure.

Referring to FIG. 1, a mobile device 100 may include sensors 101, a processor 107, a memory 108, a user input device 114, a communications radio 109 and a display 115.

The sensors 101 may, for example, measure physical quantities or detect operational states associated with the mobile device 100, and convert the measured or detected information into electric signals. The sensors 101 may include a biometric sensor 102, a location sensor 103, a behavior sensor 104, a network sensor 105, a time sensor 106, a gesture sensor (not shown), a gyro sensor (not shown), a barometric pressure sensor (not shown), a magnetic sensor (not shown), an acceleration sensor (not shown), a grip sensor (not shown), a RGB color sensor (not shown), a temperature sensor (not shown), a humidity sensor (not shown), an illumination sensor (not shown), a proximity sensor (not shown) and an ultraviolet (UV) sensor (not shown).

For example, a location sensor 103 may be a Global Positioning System (GPS) device or a triangulation device that may provide location information such as GPS coordinates. A time sensor 106 may be a GPS device or a clock that may provide time information such as hours, minutes and seconds. A network sensor 105 may be a transmission control protocol (TCP) and the internet protocol (IP) compliant device that can detect an IP address. A behavior sensor 104 may be a context aware application running on the mobile device that may monitor user behavior such as login events, application use and ignored notifications by the user. For example, a device unlock event is highly indicative of user behavior such as user presence; whereas, a pop-up notification that has been ignored by the user for an extended period of time is highly indicative of user absence. The behavior sensor 104 may be a context aware application that may receive data from one or any combination of the biometric sensor 102, location sensor 103, behavior sensor 104, network sensor 105, time sensor 106, gesture sensor, gyro sensor, barometric pressure sensor, magnetic sensor, acceleration sensor, grip sensor, RGB color sensor, temperature sensor, humidity sensor, illumination sensor, proximity sensor and ultraviolet (UV) sensor to predict the behavior of a user.

According to various embodiments, the mobile device 100 may further include a microprocessor configured to control the sensors 101, as a part of or separately from the processor 107. Thus, while the mobile device 100 is in a sleep state, the separate microprocessor may control the sensors 101.

The sensors 101 collect relevant information for identifying a user that may include biometric measures, location factors, network factors, software state, motion and time.

The communications radio 109 may include, for example, a cellular interface 110, a wireless fidelity (Wi-Fi) interface 111, a Bluetooth (BT) interface 112 and a Radio Frequency (RF) transceiver 113. The RF transceiver 113 is connected to an antenna and communicates with the cellular interface 110, the Wi-Fi interface 111, and the BT interface 112.

The cellular interface 110 may provide services such as voice call, video call, text messaging, or an Internet service through a communication network. According to an embodiment of the present disclosure, the cellular interface may perform at least a part of the functionalities of the processor 107.

The Wi-Fi, BT and cellular interfaces may be used to connect the mobile device 100 to an enterprise network. The RF transceiver 113 may transmit and receive, for example, communication signals (for example, RF signals) to and from the cellular, BT and/or BT interfaces. The RF transceiver 113 may include, for example, a transmitter, a receiver, a power amplifier, a frequency filter, a low noise amplifier (LNA), an antenna, or the like.

Figure 2:
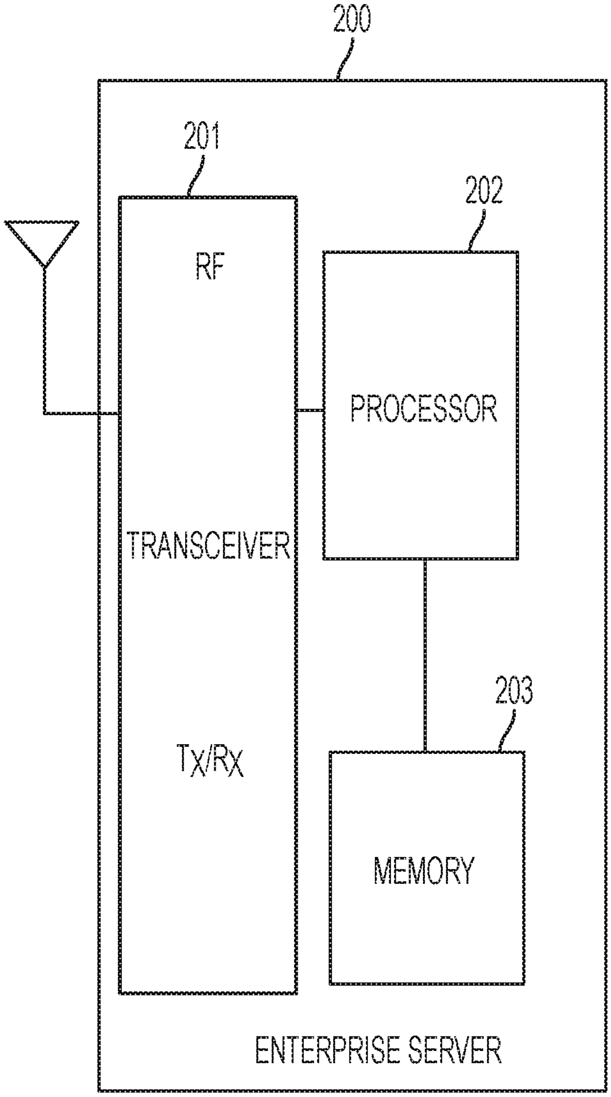
FIG. 2 illustrates a block diagram of an enterprise server according to an embodiment of the present disclosure.

The communications radio 109 may transmit and receive data to and from an enterprise server 200 (FIG. 2).

The input device 114 may include, for example, a touch panel, and/or a key (not shown). The touch panel may operate in at least one of, for example, capacitive, resistive, infrared, and ultrasonic schemes. The key may include, for example, a physical button, an optical key, or a keypad.

The processor 107 may be a Central Processing Unit (CPU), a Field Programmable Gate Array (FPGA), a general purpose computer, a special purpose computer, or other programmable data processing apparatus.

The memory 108 may be a built-in memory or an external memory. The built-in memory is capable of including at least one of the following: a volatile memory, e.g., a dynamic random access memory (DRAM), a static RAM (SRAM), a synchronous DRAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

FIG. 2 illustrates a block diagram of an enterprise server according to an embodiment of the present disclosure.

Referring to FIG. 2, an enterprise server 200 may include a processor 202, a memory 203 and a RF transceiver 201. The RF transceiver 201 may include the cellular interface (not shown), the Wi-Fi interface (not shown), and the BT interface (not shown). The RF transceiver 201 is connected to an antenna and may transmit and receive data from a mobile device (FIG. 1).

The processor 202 may be a Central Processing Unit (CPU), a Field Programmable Gate Array (FPGA) and the like.

The memory 203 may be a built-in memory or an external memory. The built-in memory is capable of including at least one of the following: a volatile memory, e.g., a dynamic random access memory (DRAM), a static RAM (SRAM), a synchronous DRAM (SDRAM), etc.; and a non-volatile memory, e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., an NAND flash memory, an NOR flash memory, etc.), a hard drive, a solid state drive (SSD), etc.

Figure 3:
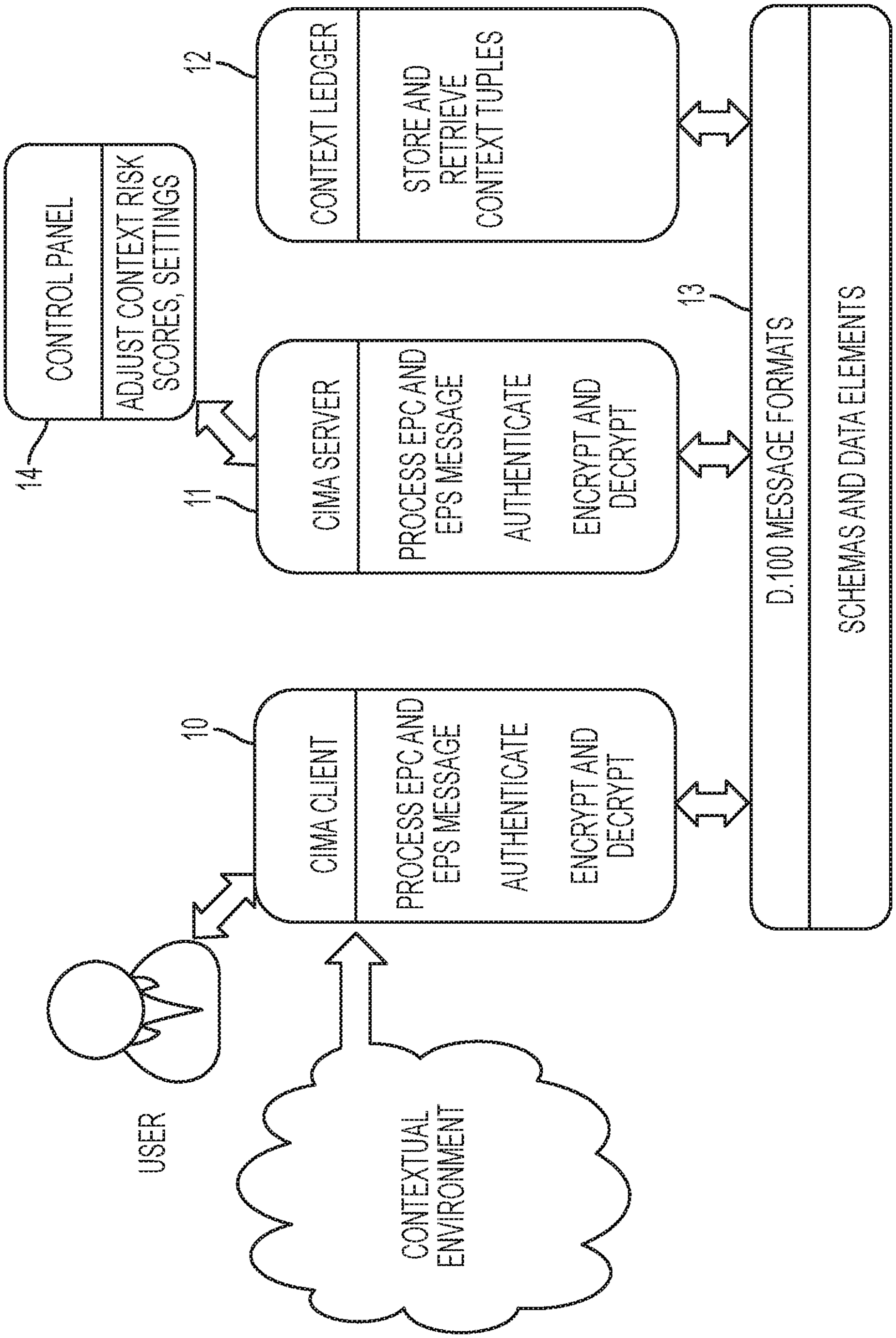
FIG. 3 illustrates a top level architecture of a context integrity measurement architecture (CIMA) composed of subsystems according to an embodiment of the present disclosure.

FIG. 3 illustrates a top level architecture of a context integrity measurement architecture (CIMA) composed of subsystems according to an embodiment of the present disclosure.

Referring to FIG. 3, the subsystems of CIMA may include CIMA client (end point device) 10, CIMA server 11, context ledger 12, message formats 13 and control panel 14. These subsystems may be used to build Merkle context tree, verify the continuity of context from the very first network session to the current session, determine how "close" the current context is to a previously known context, use past context as a shared secret between the enterprise, device and user, use context continuity, behavioral proximity and shared secrets as the basis for risk assessment scores to validate authenticity of the end user device (mobile device) and an enterprise, enable review of the entire history of context for a mobile device and user, obfuscate contextual data using cryptographic hashes while enabling continuity verification, behavioral proximity measurement, shared secrets, mutual risk assessment, and auditability, store only the current and previous hash trees, and possibly the root hashes of the prior trees, incorporate new contexts into the continuity measurements as needed, based on additional security challenges to the user, additional sensors, and additional context sources. Each of these subsystems will be described with respect to FIGS. 4 to 26 below.

Figure 4:
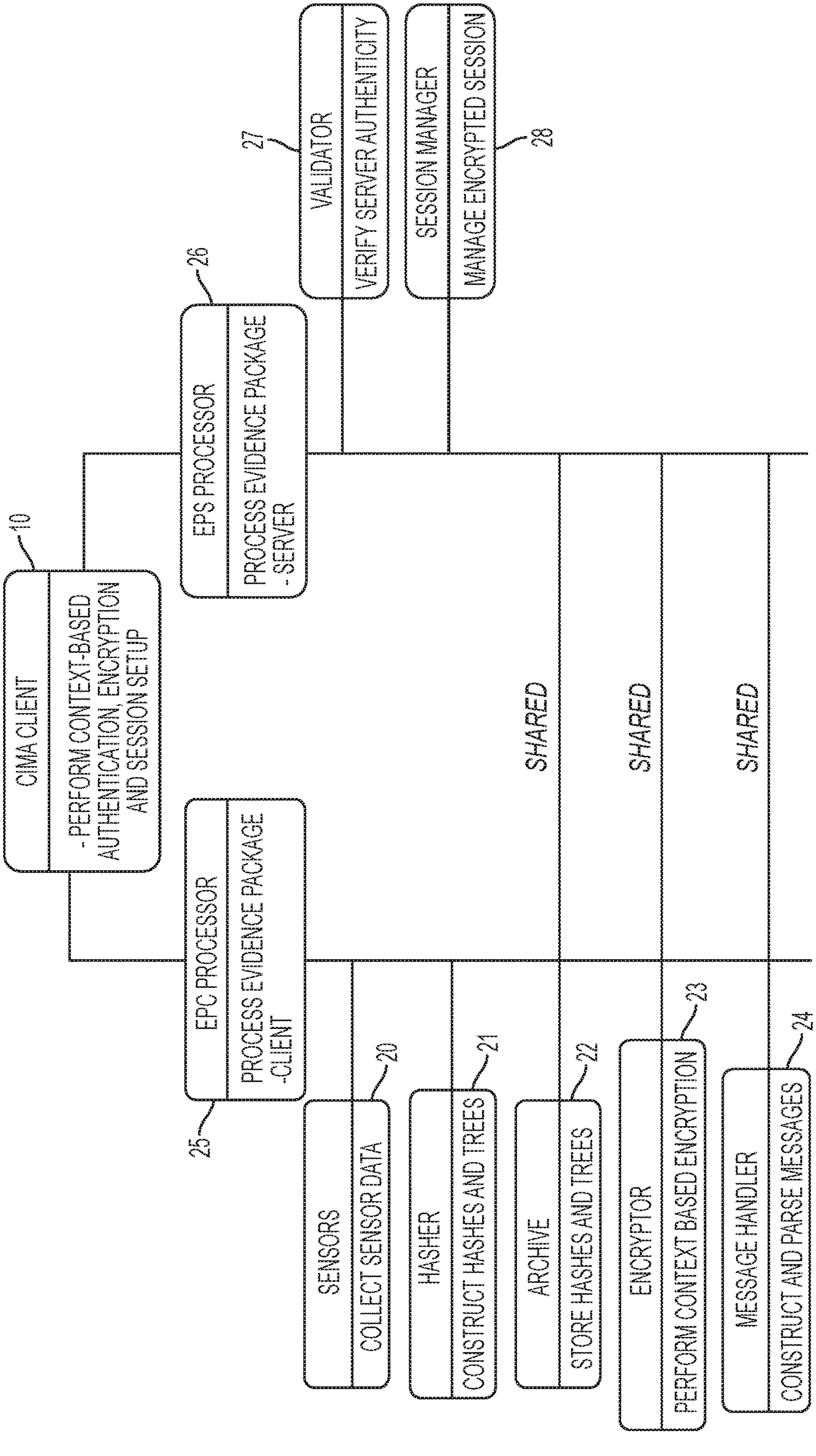
FIG. 4 illustrates CIMA client structure according to an embodiment of the present disclosure.

FIG. 4 illustrates CIMA client structure according to an embodiment of the present disclosure.

Referring to FIG. 4, a CIMA client 10 may include hardware and/or software functions that may include sensors 20, hasher 21, an archive 22, an encryptor 23, message handler 24, an evidence package client (EPC) processor 25, an evidence package server (EPS) processor 26, validator 27 and session manager 28. These architectural subsystems interact with each other and with an CIMA server 11 as shown in FIG. 3.

It will be understood that each of the hasher 21, archive 22, encryptor 23, message handler 24, evidence package client (EPC) processor 25, evidence package server (EPS) processor 26, validator 27 and session manager 28 may be implemented by way of computer program instructions, context-processing algorithms and data structures stored in memory 108.

The session initiation by the session manager 28 triggers a context snapshot from the sensors 20 such as biometric, location, behavior, network and time (FIG. 1). The data captured from sensors 20 may include biometric measures, location factors, network factors, software state, motion and time.

The hasher 21 of the CIMA client 10 hashes data and builds Merkle context tree based on the hashed data. A Merkle tree is a binary tree constructed by hashing $2^n$ data leaves.

The Merkle context tree construction by CIMA will now be described with respect to FIG. 5.

Figure 5:
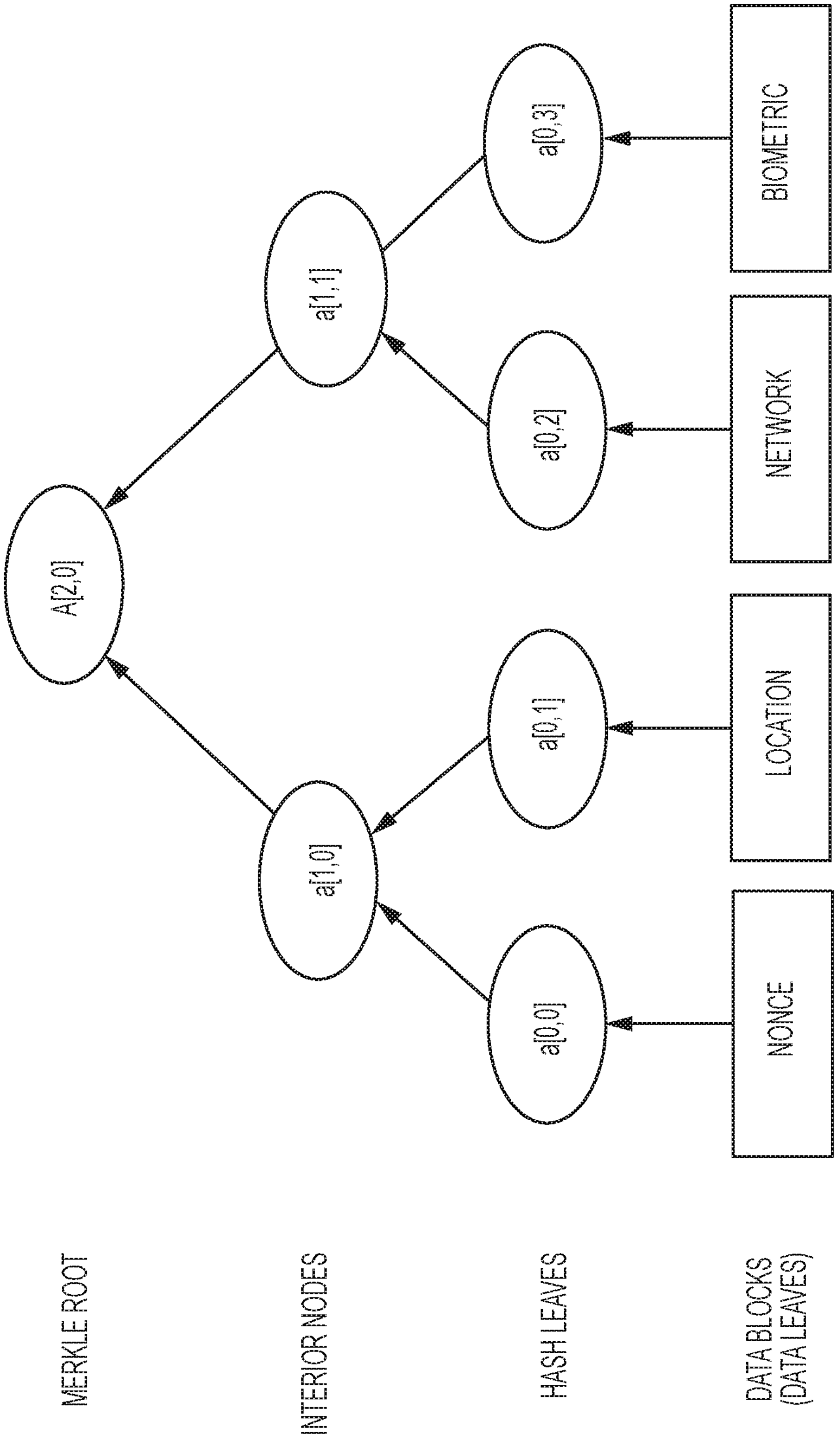
FIG. 5 illustrates an example of initial Merkle context tree construction from contextual data blocks according to an embodiment of the present disclosure.

FIG. 5 illustrates an example of initial Merkle context tree construction from contextual data blocks according to an embodiment of the present disclosure.

Referring to FIG. 5, the contextual data blocks may include a one-time random 'nonce', GPS coordinates, Wi-Fi network IP address, and biometric data. The GPS coordinates, Wi-Fi network IP address, and biometric data may contain information about a user's operational context captured by the sensors 20 at the beginning of a network session. For example, one block might contain location information such as a string of GPS coordinates, with latitude and longitude stored as decimal degrees (e.g., 37.7699833333336 and −122.46626166666668), and altitude stored as decimal meters (e.g., 2.35). Another block may be network information such as a string of characters representing the IPv6 address of a visible Wi-Fi network (e.g., ABC:567::8888:9999:1111:0). Another block may contain a biometric data such as a 300-byte string representing a fingerprint. An initial data block for a CIMA measurement may also include a nonce such as a random cryptographic nonce, for example, a random or pseudorandom number.

From these data blocks (data leaves in FIG. 5), a Merkle Tree is constructed by taking a hash of data blocks to create hash leaves a[0,0], a[0,1], a[0,2] and a[0,3]. Each hash is then paired with another hash and the resulting concatenation is hashed again. For example, hash a[0,0] is paired with a[0,1] to create interior node a[1, 0] and hash a[0,2] is paired with a[0,3] to create interior node a[1,1]. This pairing and hashing process continues, as depicted in FIG. 5, until only a single hash A[2,0] remains (called the Merkle root). The tree has a height of h levels, and the index value i denotes the height of a particular level. In FIG. 5, hash leaves are at level i=0; interior nodes are at i=1; and the Merkle root is at i=2. A tree of height h will have 2 h leaves. That is, hash of each data block produces a hash leaf. Hash leaves are paired and hashed again to produce interior nodes. The hashing process continues until it produces the apex hash, or Merkle root.

Figure 6:
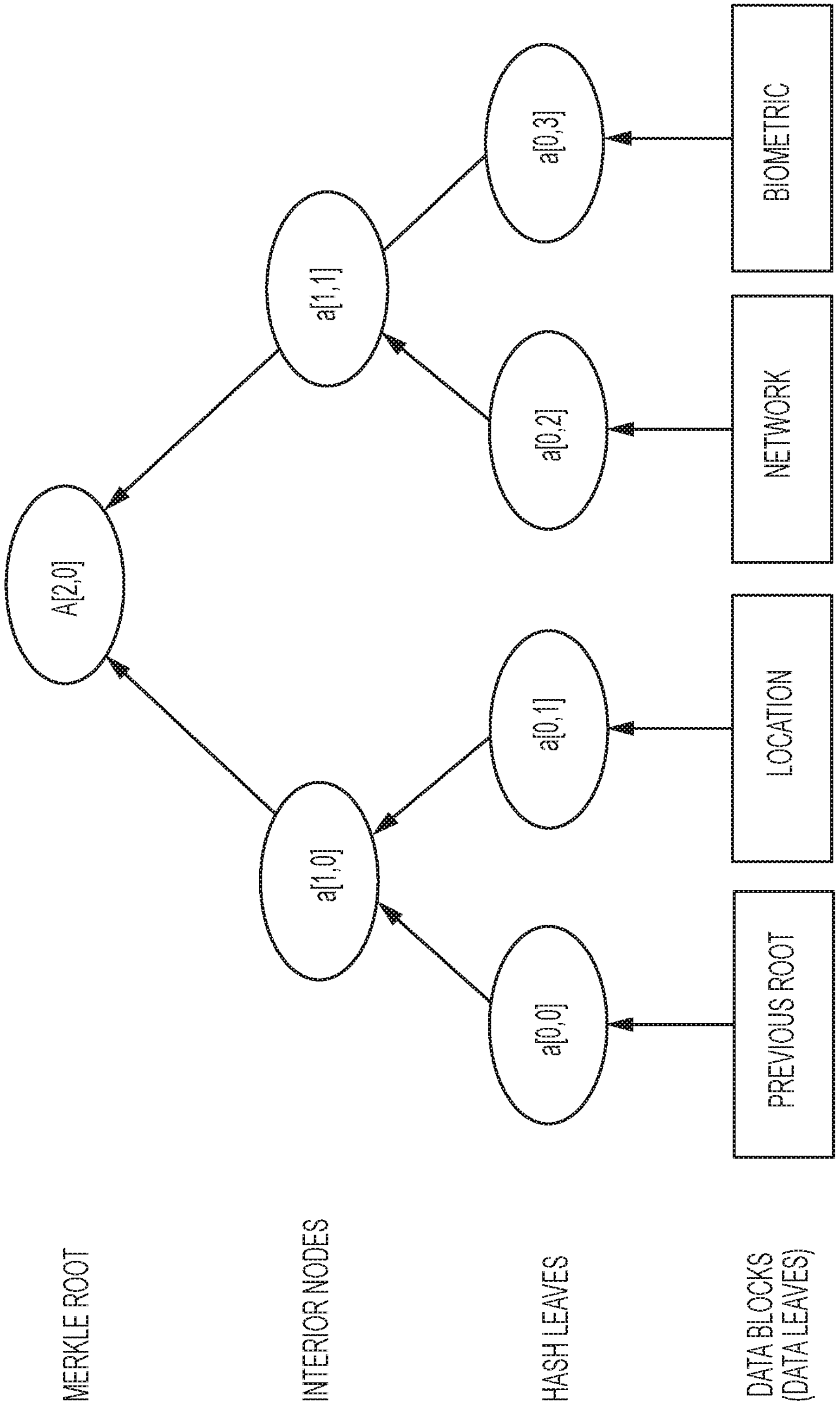
FIG. 6 illustrates block chaining in Merkle context trees to guarantee the continuity of context between subsequent sessions and an initial session according to an embodiment of the present disclosure.

FIG. 6 illustrates block chaining in Merkle context trees to guarantee the continuity of context between subsequent sessions and an initial session according to an embodiment of the present disclosure.

Referring to FIG. 6, in subsequent sessions, the nonce data block of FIG. 5 is substituted with the previous root to provide continuity of context. That is, under the CIMA approach, the first time a mobile device connects to a CIMA-aware network, the Merkle tree that encodes context uses a nonce as one of the data blocks. All subsequent network sessions replace the nonce with the Merkle root generated during the previous session as shown in FIG. 6.

Figure 7:
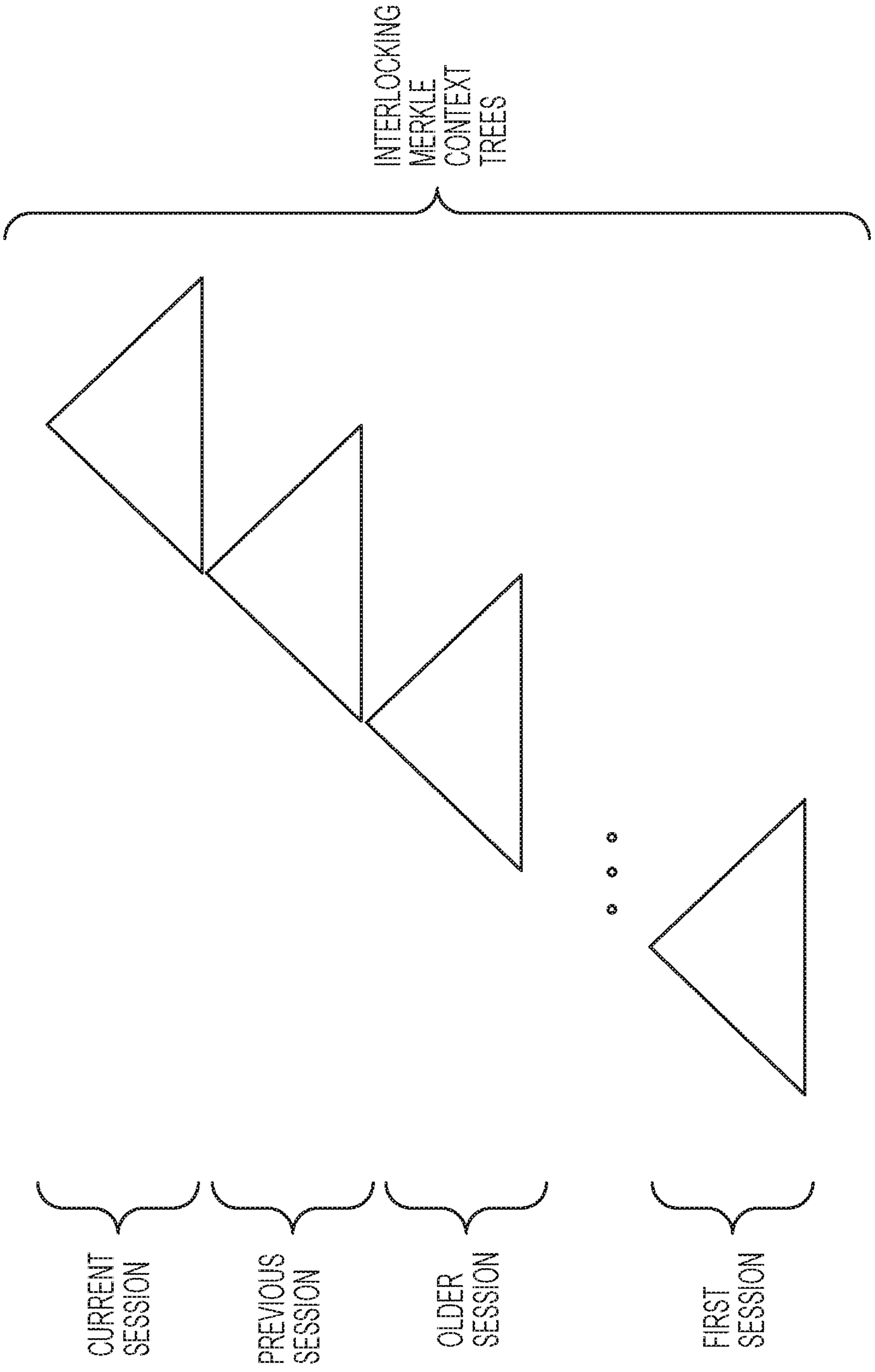
FIG. 7 illustrates continuity of context and behavior according to an embodiment of the present disclosure.

FIG. 7 illustrates continuity of context and behavior according to an embodiment of the present disclosure.

Referring to FIG. 7, the Merkle context trees from current session, previous session, older session and first session may be interlocked so as to establish the continuity of context and behavior from the current session to the first session.

Figure 8:
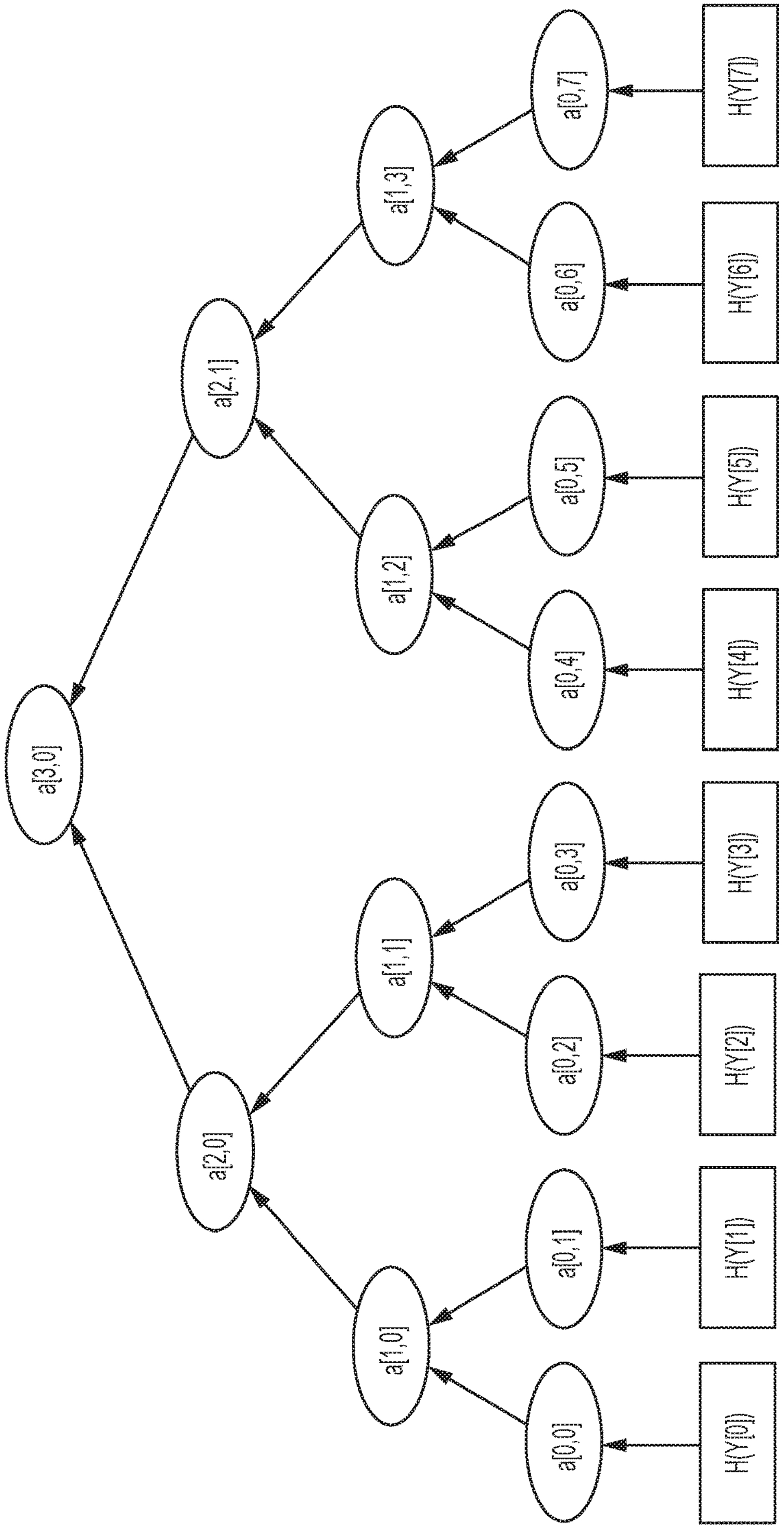
FIG. 8 illustrates adding and subtracting contextual parameters in CIMA according to an embodiment of the present disclosure.

FIG. 8 illustrates adding and subtracting contextual parameters in CIMA according to an embodiment of the present disclosure.

CIMA may adapt and scale in three ways. First, it may incorporate any arbitrary number of contextual parameters. Second, it may adapt to users who own multiple devices. Third, it may preserve and account for behavioral integrity if multiple people use the same end point device.

Referring to FIG. 8, since Merkle context trees are binary trees, they may be built on $2^n$ data blocks. FIGS. 5 and 6 show $2^2$=4 data blocks, and 2n−1=7 nodes. The next size tree has $2^3$=8 data blocks (Hy[0] to Hy[7]) and 2n−1=15 nodes (a[0,0] to a[3,0]). This scaling property means that, although context data can expand to any arbitrary number, the data blocks that are "unused" at a particular scale must be populated by a cryptographic nonce.

Figure 9:
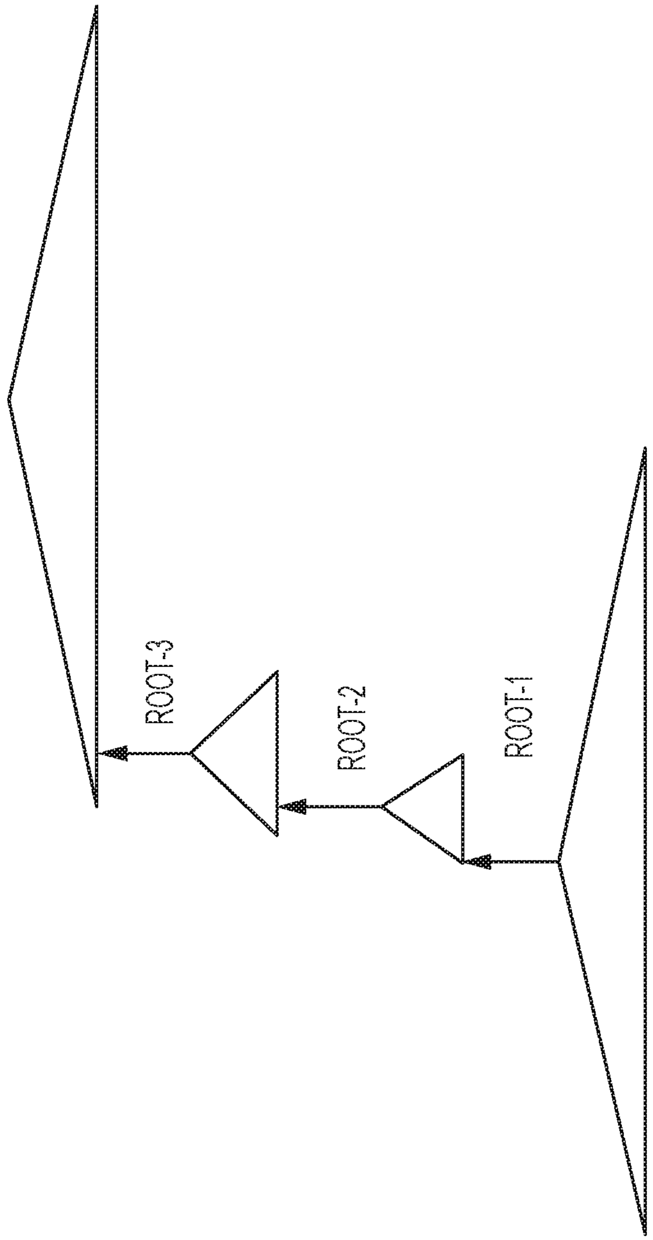
FIG. 9 illustrates block chain linkage of Merkle context trees at different scales according to an embodiment of the present disclosure.

FIG. 9 illustrates block chain linkage of Merkle context trees at different scales according to an embodiment of the present disclosure.

Referring to FIG. 9, root-1, root-2, and root-3 of Merkle context trees may be linked in block chains even if they are at different scales. This enables assertion of behavioral continuity even when sensor-based context measurements vary over time.

End point devices may only need to communicate the minimum data required for the enterprise to construct a Merkle context trees for the session. If the device communicates the leaf node hashes, then the enterprise may compute all interior nodes, and the root node. Limiting transmission to just the hashes of data blocks improves the efficiency of the communication. Similarly, the enterprise may only communicate knowledge about a prior interior node hash in order to prove that the enterprise is authentic. A single hash may do, used only once.

If Merkle context trees expand or contract over time, the enterprise may still measure continuity of context and proximity of behavior as long as the enterprise has the ability to compare leaf node hashes from one session to the next. The enterprise may make these comparisons if all leaf node hashes are labeled. Hashes may be labeled either explicitly or implicitly. An example of an explicit label might be: GPS-DFCD3454BBEA788A751A696C24097009CA992D17, where 'GPS' is a label describing the hash of data in a specific format, and 'DCF . . . ' is a leaf node instance of the hash. An example of an implicit label might be: Version 1.23 where the format version identifies (in a version catalog) that the first hash is GPS data in a specific format, the second hash is an IPv6 network address, etc. A version number can be used as a schema catalog reference for all data in a structured message, and is therefore more efficient than explicit labels.

Given that leaf node hash data is labeled, either explicitly or implicitly, a risk score may be computed even if available context sensors changes. Context aperture is what the mobile device (CIMA client) can measure based on available context sensors. For example, if a user carries a mobile device into a building, the GPS signal may no longer be visible, and the context aperture is therefore reduced. The context aperture may increase or decrease over time due to external or internal conditions.

For measuring behavioral proximity if context aperture is the same, let the Context Aperture for Session 1 be defined by sensor measurements A, B, C, and D. Let the Context Aperture for Session 2 be defined by sensor measurements A', B', C' and D', where the sensors are of the same type and generate data in the same format as in Session 1.

Let $w_a$=the weight assigned to data from Sensor A $w_b$=the weight assigned to data from Sensor B $w_c$=the weight assigned to data from Sensor C $w_d$=the weight assigned to data from Sensor D Let H(A)=The hash of data block A; while H(A')=The hash of data block A'

H(B)=The hash of data block B; while H(B')=The hash of data block B'

H(C)=The hash of data block C; while H(C')=The hash of data block C'

H(D)=The hash of data block D; while H(D')=The hash of data block D'

Let XA=1 if {H(A)−H(A')}=0; and XA=0 otherwise.

XB=1 if {H(B)−H(B')}=0; and XB=0 otherwise.

XC=1 if {H(C)−H(C')}=0; and XC=0 otherwise.

XD=1 if {H(D)−H(D')}=0; and XD=0 otherwise.

Let RC=The match value of the Root Hash Block (RHB) computed by the enterprise compared to the value sent by the end point device. If they match, then RC=1; otherwise RC=0.

Let Rm=The measured behavioral proximity score, based on context.

Then Rm=RC*{(wa*XA)+(wb*XB)+(wc*XC)+(wd*XD)}

For measuring behavioral proximity if context aperture changes, let the Context Aperture for Session 1 be defined by sensor measurements A, B, C, and D. Let the Context Aperture for Session 2 be defined by sensor measurements A', B', and D', where the sensors are of the same type and generate data in the same format as in Session 1. Since Sensor C is not available in Session 2, the hash of the null measurement should be different from a value obtained in Session 1. Therefore, XC=0. The behavioral proximity score, Rm, is measured as before, but now the score is lower because of the reduced amount of evidence. The implication is that enterprise network operator should consider potential sensor drop-outs in setting the risk threshold.

Referring back to FIG. 4, an archive 22 stores the Merkle context trees. The archive 22 may be a block chain database (context ledger) that may be shared by CIMA client (end point devices such as a mobile device) and CIMA server (an enterprise server). The archive 22 may only store the current and previous hash trees, and possibly root hashes of the prior trees to conserve the memory of the end point devices.

A message handler 24 may construct evidence package client (EPC) message and parse evidence package server (EPS) message. The EPC and EPS messages are the Evidence Packages. EPC message may be transmitted by the client device to the enterprise server to prove continuity of context and proximity to "normal" behavior. The EPC message may contain a user context record (UCR) that may comprise at least one of hash leaf nodes, interior nodes or a Merkle root (FIG. 5). Whereas, the EPS may be provided by the enterprise server 200 to the client device (mobile device 100) to prove that the enterprise is authentic because it has knowledge of the client's prior context (EPS Message). The EPS message may contain information in the form of a pre-shared secret as a proof of knowledge including one or more interior nodes of prior Merkle tree.

An encryptor 23 may perform context based encryption to secure EPC and EPS messages as they communicate information related to risk and identity. The encryptor 23 may share encrypted data so that both the end point device and the enterprise are aware of the contextual history of the device and the user. Therefore, context history is a type of pre-shared secret, and can be used not only by the enterprise to assess risk associated with connecting the device, but can be used by the device to verify the authenticity of the enterprise network. The end point device and enterprise server only need to provide each other with prior Merkle roots in order to establish mutual authenticity.

FIG. 10 illustrates a message schema that communicates continuity and context information to the enterprise according to an embodiment of the present disclosure.

Referring to FIG. 10, a message type may be 'EPC', and the format version number may be a catalog reference that describes a message schema. The version may be specific for a platform, since it describes assumptions about data formats and a data model for sensor output. The time stamp enhances the auditability of the EPC context report. It may also help to prevent replay types of attacks, since date and time are embedded into the encryption key generation process. Assuming that the enterprise has constructed Merkle context trees from previous sessions, and assigned each hash to a device. The platform can therefore use an interior hash node from the last session as a 'context authenticator' to prove to the enterprise the source of data. This context authenticator is also used in the key generation process. If the context authenticator is modified, the encrypted data blob which carries the context payload won't decrypt. If the message payload does not decrypt, then there may be evidence of potential tampering.

Figure 11:
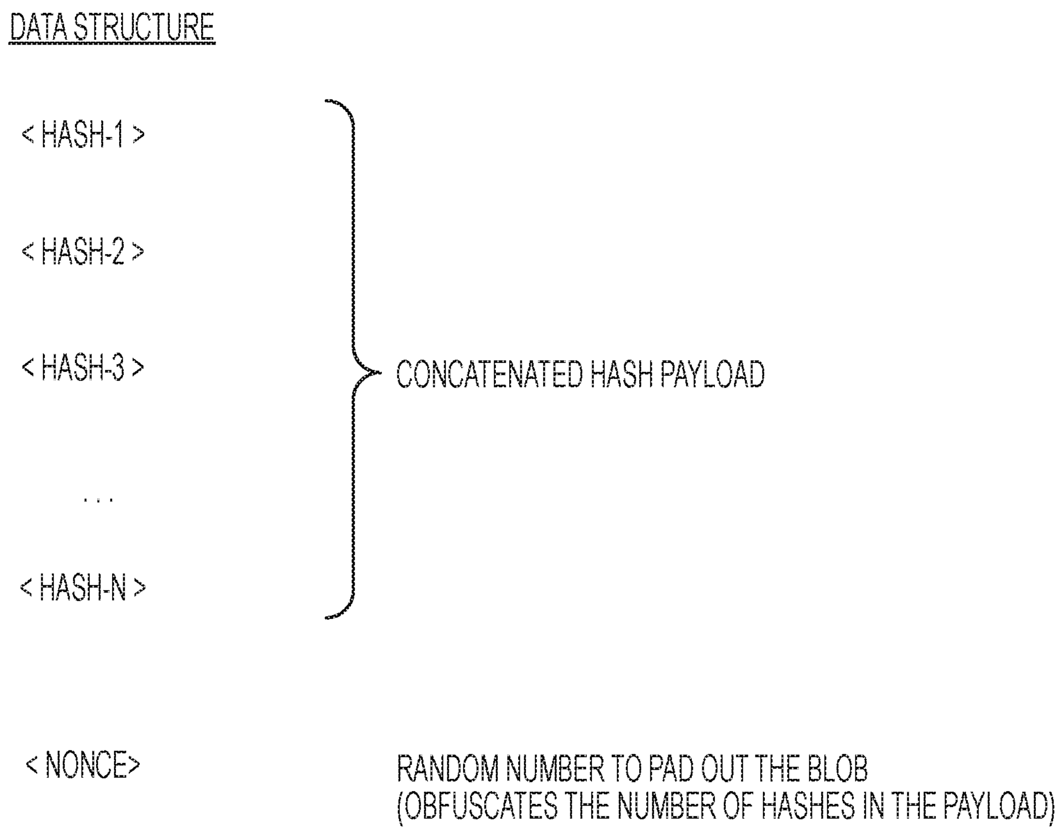
FIG. 11 illustrates an EPC encrypted data blob according to an embodiment of the present disclosure.

FIG. 11 illustrates an EPC encrypted data blob according to an embodiment of the present disclosure.

Referring to FIG. 11, the EPC encrypted data blob may be a concatenation of data hashes HASH-1 to HASH-N, and the entire payload may be encrypted using a context based encryption key. This approach makes side-channel crypto attacks more difficult, because there are no repeated clear text markers that can be used as a reference for code cracking. The nonce is simply a random string. The purpose of the nonce is two-fold: (1) to obfuscate the number of hashes carried in the message payload, and therefore limit the amount of information available to the attacker about context; and (2) to reuse as a shared secret between the end point and the enterprise.

Figure 12:
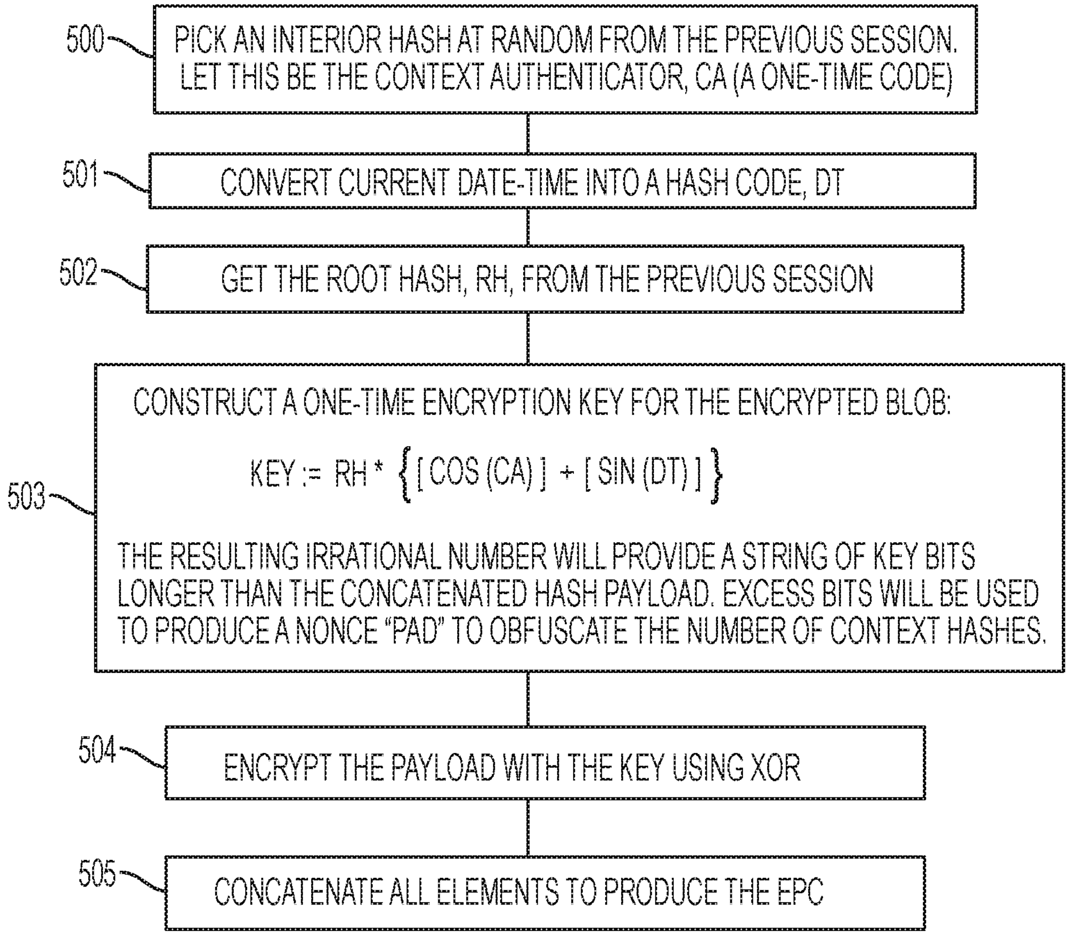
FIG. 12 illustrates an EPC message construction process of the message handler of FIG. 4 that includes generating encryption key, encrypting and concatenating to produce the EPC message according to an embodiment of the present disclosure.

FIG. 12 illustrates an EPC message construction process of the message handler of FIG. 4 that includes generating encryption key, encrypting and concatenating to produce the EPC message according to an embodiment of the present disclosure.

Referring to FIG. 12, a message handler 24 may pick an interior hash at random from a previous session as a context authenticator (CA) in operation 500. In operation 501, the message handler 24 may convert date-time into a hash code, DT. In operation 502, the message handler 24 may get a root hash (RH) of a previous session. In operation 503, the message handler 24 may construct a one-time encryption key for the encrypted blob using an equation such as the one shown FIG. 12. It would be understood that the equation is provided only as an example and not for the purpose of limiting the present disclosure. The resulting "KEY" is not only an encryption key, it may also be a zero-knowledge proof of identity that includes safeguards against man-in-the-middle hijacking. Because the "KEY" is used only once, and because it encrypts a payload that contains no clear text data as a reference, and because the length of the actual payload is hidden by a nonce, it is unlikely that any brute force and/or side-channel attack would ever work against the key.

In operation 504, the message handler 24 may encrypt the payload with the key using XOR and concatenate all elements to produce the EPC message.

Referring back to FIG. 4, the EPC processor 25 may add header to EPC message prior to transmitting the EPC to the enterprise. The EPS processor 26 may decrypt EPS message received from the enterprise.

The validator 27 may verify the enterprise server's authenticity based on information such as a hash of a prior Merkle root received from the enterprise server as proof of authenticity. In particular, the validator 27 of the CIMA client on the end point device assesses risk based on knowledge of prior context provided by the enterprise.

Figure 13:
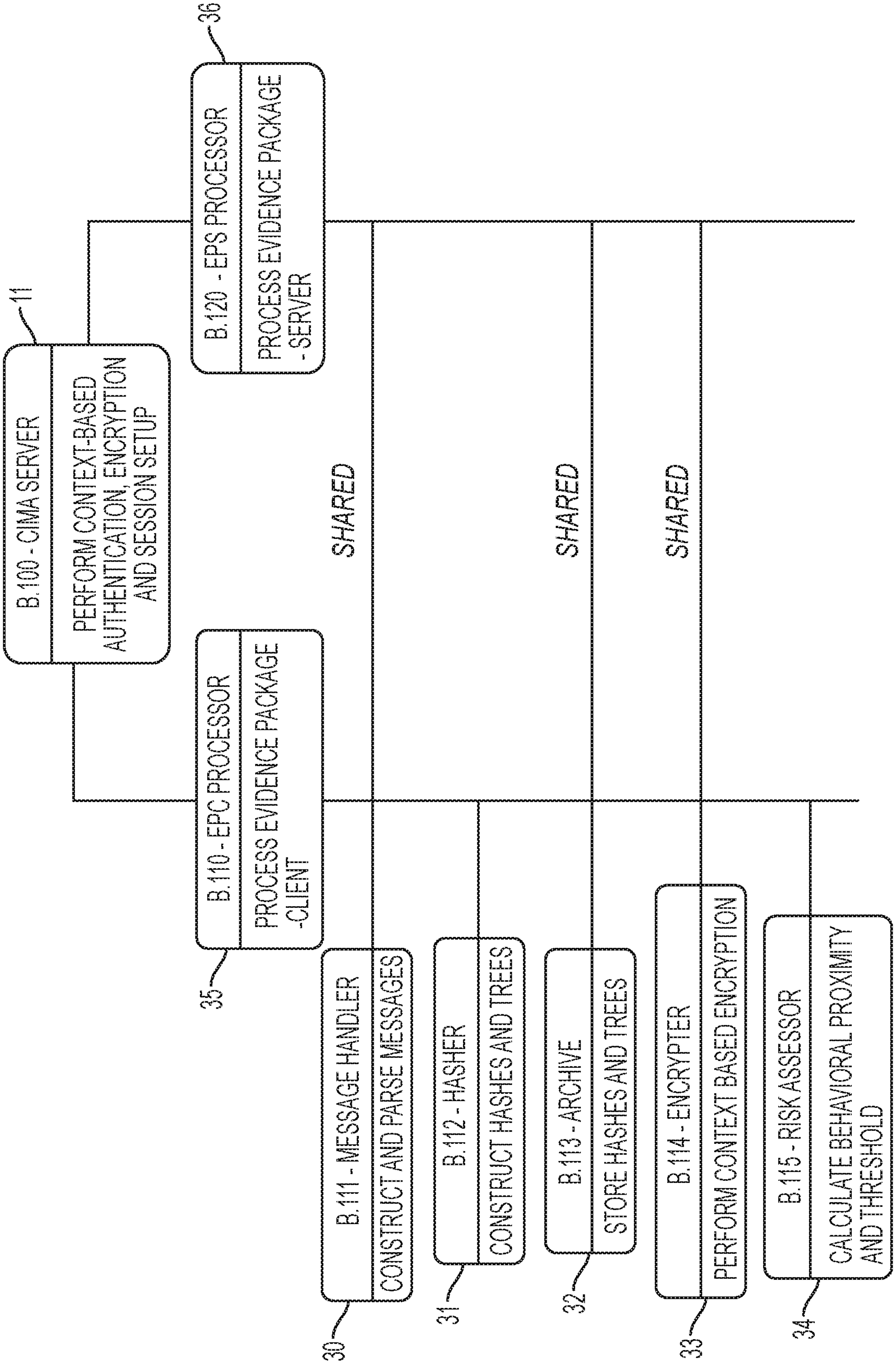
FIG. 13 illustrates CIMA server structure according to an embodiment of the present disclosure.

FIG. 13 illustrates CIMA server structure according to an embodiment of the present disclosure.

Referring to FIG. 13, a CIMA server 11 may include hardware and/or software functions that may include a message handler 30, an hasher 31, an archive 32, an encryptor 33, a risk assessor 34, an evidence package client (EPC) processor 35, and an evidence package server (EPS) processor 36. These architectural subsystems interact with each other and with an CIMA server 11 as shown in FIG. 3.

It will be understood that each of the message handler 30, hasher 31, archive 32, encryptor 33, risk assessor 34, evidence package client (EPC) processor 35, and evidence package server (EPS) processor 36 may be implemented by way of computer program instructions, context-processing algorithms and data structures stored in memory 108.

A message handler 30 may construct evidence package server (EPS) message and parse evidence package client (EPC) message. The EPC and EPS messages are the Evidence Packages. EPC message may be transmitted by the client device to the enterprise server to prove continuity of context and proximity to "normal" behavior. The EPC message may contain a user context record (UCR) that may comprise at least one of hash leaf nodes, interior nodes or a Merkle root (FIG. 5). Whereas, the EPS may be provided by the enterprise server 200 to the client device (mobile device 100) to prove that the enterprise is authentic because it has knowledge of the client's prior context (EPS Message). The EPS message may contain information in the form of a pre-shared secret as a proof of knowledge including one or more interior nodes of prior Merkle tree.

Figure 14A:
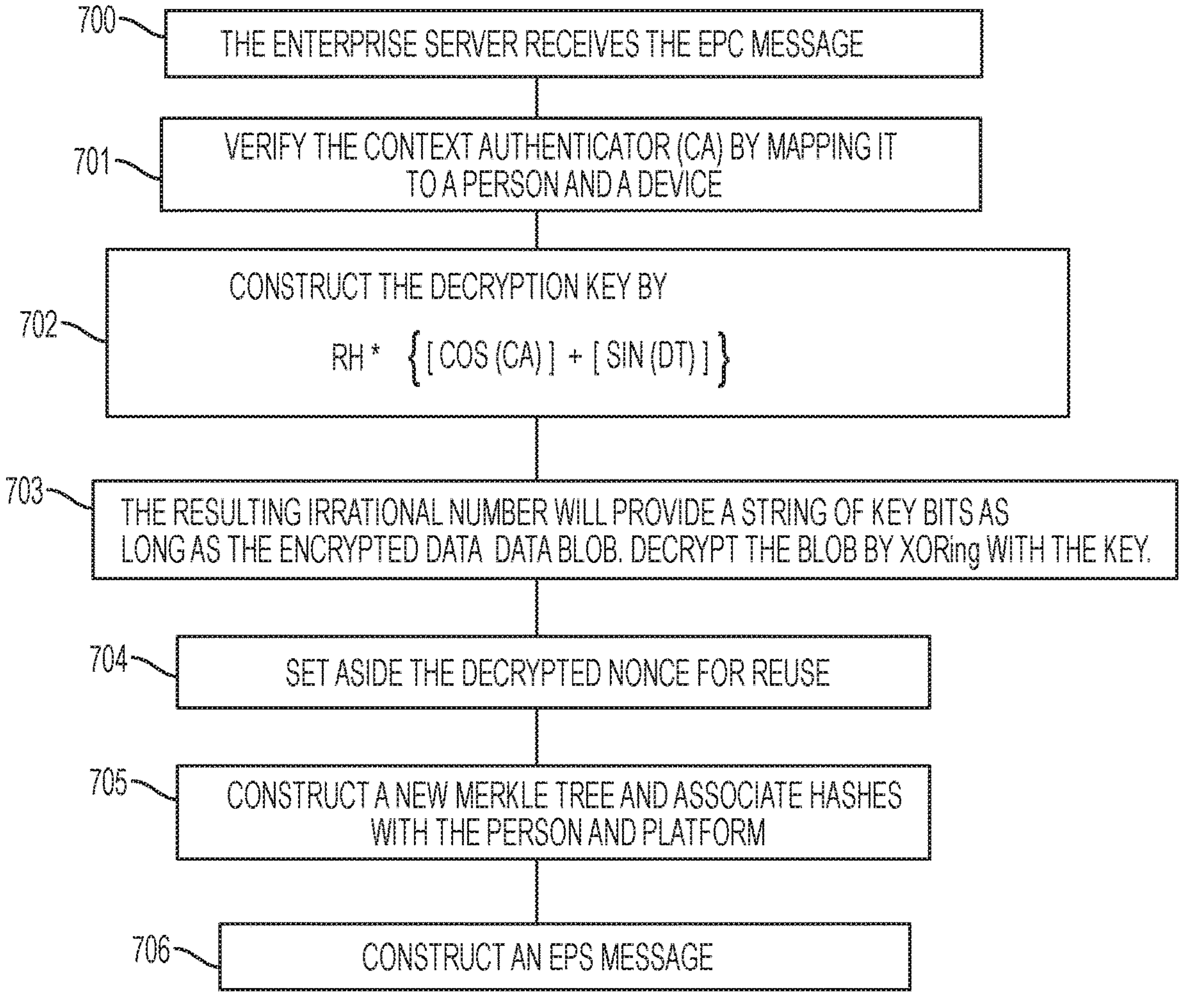
FIG. 14A illustrates a process for decrypting EPC message by an enterprise server (CIMA server) according to an embodiment of the present disclosure.

FIG. 14A illustrates a process for decrypting EPC message by an enterprise server (CIMA server) according to an embodiment of the present disclosure.

Referring to FIG. 14A, the message handler 30 of the enterprise server 200 may receive the EPC message in operation 700 and verify the context authenticator by mapping it to a person and a device in operation 701. In operations 702 and 703, the enterprise server may construct a decryption key using an equation shown in FIG. 14A and decrypt the data blob (payload) by XORing with the decryption key. It would be understood that the equation for constructing decryption key is provided only as an example and not for the purpose of limiting the present disclosure. In operation 704, the hasher 31 may set aside the decrypted nonce for reuse. In operation 705, the hasher 31 may construct a new Merkle tree and associate hashes with the person and platform. In operation 706, the message handler 30 constructs an EPS message in accordance with the process described in FIG. 14B below.

Figure 14B:
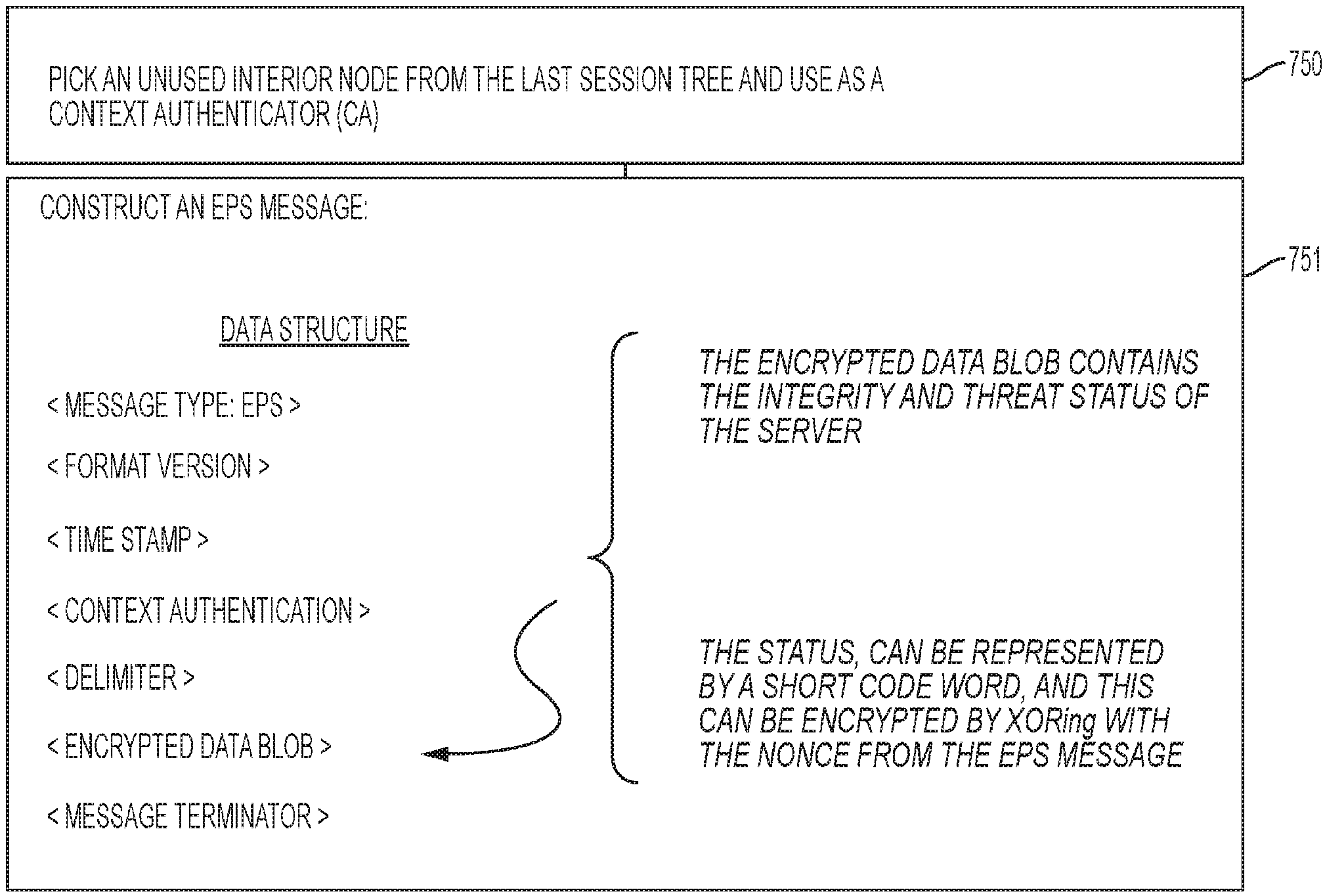
FIG. 14B illustrates an EPS message construction process of the message handler of FIG. 13 according to an embodiment of the present disclosure.

FIG. 14B illustrates an EPS message construction process of the message handler of FIG. 13 according to an embodiment of the present disclosure.

Referring to FIG. 14B, in operations 750 and 751, the message handler 30 may use an unused interior node from the last session tree as a context authenticator and construct an EPS message. The nonce from the EPC message may be used to create a new one-time encryption key for the EPS response. The message type may be 'EPS', and the format version number may be a catalog reference that describes a message schema. The version may be specific for a platform, since it describes assumptions about data formats and a data model for sensor output. The time stamp enhances the auditability of the EPC context report. It may also help to prevent replay types of attacks, since date and time are embedded into the encryption key generation process. Assuming that the enterprise has constructed Merkle context trees from previous sessions, and assigned each hash to a device. The platform can therefore use an interior hash node from the last session as a 'context authenticator' to prove to the enterprise the source of data. This context authenticator is also used in the key generation process. If the context authenticator is modified, the encrypted data blob which carries the context payload won't decrypt. If the message payload does not decrypt, then there may be evidence of potential tampering.

Referring back to FIG. 13, the hasher 31 of the CIMA server 11 constructs Merkle context tree based on the hash leaf nodes received from the CIMA client 10. The process of constructing Merkle context trees is same as described with respect to FIGS. 5 to 9 above.

The archive 32 stores the Merkle context trees. The archive 32 may be a block chain database (context ledger) that may be shared by CIMA client (end point devices such as a mobile device) and CIMA server (an enterprise server).

An encryptor 33 may perform context based encryption to secure EPC and EPS messages as they communicate information related to risk and identity. The encryptor 33 may share encrypted data so that both the end point device and the enterprise are aware of the contextual history of the device and the user. Therefore, context history is a type of pre-shared secret, and can be used not only by the enterprise to assess risk associated with connecting the device, but can be used by the device to verify the authenticity of the enterprise network. The end point device and enterprise server only need to provide each other with prior Merkle roots in order to establish mutual authenticity.

A risk assessor 34 at the CIMA server may assess the risk of a connection based on a weighted match score that compares current context with prior context as will be explained with reference to FIGS. 15-20.

Figure 15:
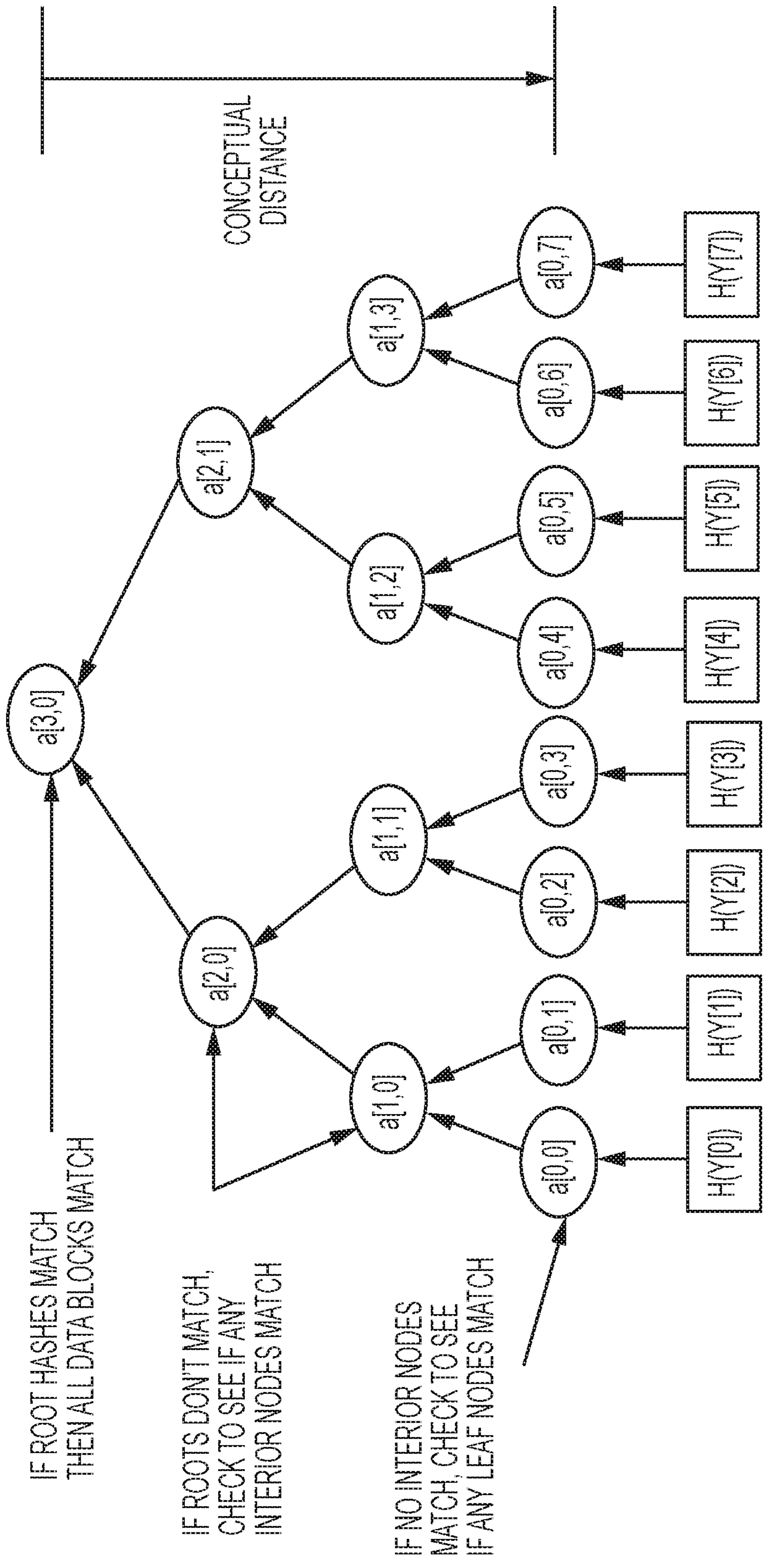
FIG. 15 illustrates tiers of a Merkle tree that can be interpreted as a measure of conceptual distance when comparing two trees of equal size according to an embodiment of the present disclosure.

FIG. 15 illustrates tiers of a Merkle tree that can be interpreted as a measure of conceptual distance when comparing two trees of equal size according to an embodiment of the present disclosure.

Referring to FIG. 15, the user with a CIMA client may engage in two-way risk assessment when he or she connects to a sensitive enterprise network. The enterprise may receive (or compute) the Merkle tree for current session or a subsequent session (e.g., FIG. 5 or FIG. 6 tree) and may compare it against previous trees stored in the archive 32. If the root hash a[3,0] matches, then at all the data blocks match. If there is a mismatch in the roots, then the next lower tier a[2, 0] to a[0,7] are checked to see if any lower nodes match. If all but one of the interior nodes matches, then a region of mismatch is identified.

When comparing a current Merkle tree against a reference tree of equal size, the tiers of the tree may be correlated with conceptual distance from a known or approved norm. The further down the tree a match is found, the greater the conceptual distance. The number of hash leaves that match hash leaves from prior trees correlate with proximity to previously identified and authenticated contexts. In assessing the degree of match, the enterprise may have a predetermined risk level for allowing a connection. This risk may be quantified. Each enterprise may decide to give different weights to each data block. For example, a biometric data block may be viewed as more critical than a date-time data block.

An enterprise risk measurement may be based on the weighted value of data block proximity relative to prior contexts. Ultimately, proximity is measured by evaluating matches against data blocks found in prior context history. For example:

Let S=The set of all data blocks D captured as context at the start of a session, i.e., $\{D_1, D_2, D_3 \ldots Dn\}$ n=the number of data blocks i=The $i^{th}$ member of S $w_i$=The weight given to the $i^{th}$ member $X_i$=The binary (0,1) match value for the data block, with X=1 if it matches, and X=0 otherwise $R_t$=The threshold value for allowable risk set by the enterprise, above which the enterprise will allow a connection Rm=The measured value of behavioral proximity, based on context Then $$Rm = \sum_{I=1}^{n} w_i * X_i$$

And the enterprise will allow a connection based on risk score alone if and only if:

$Rm>R_t$

Figure 16:
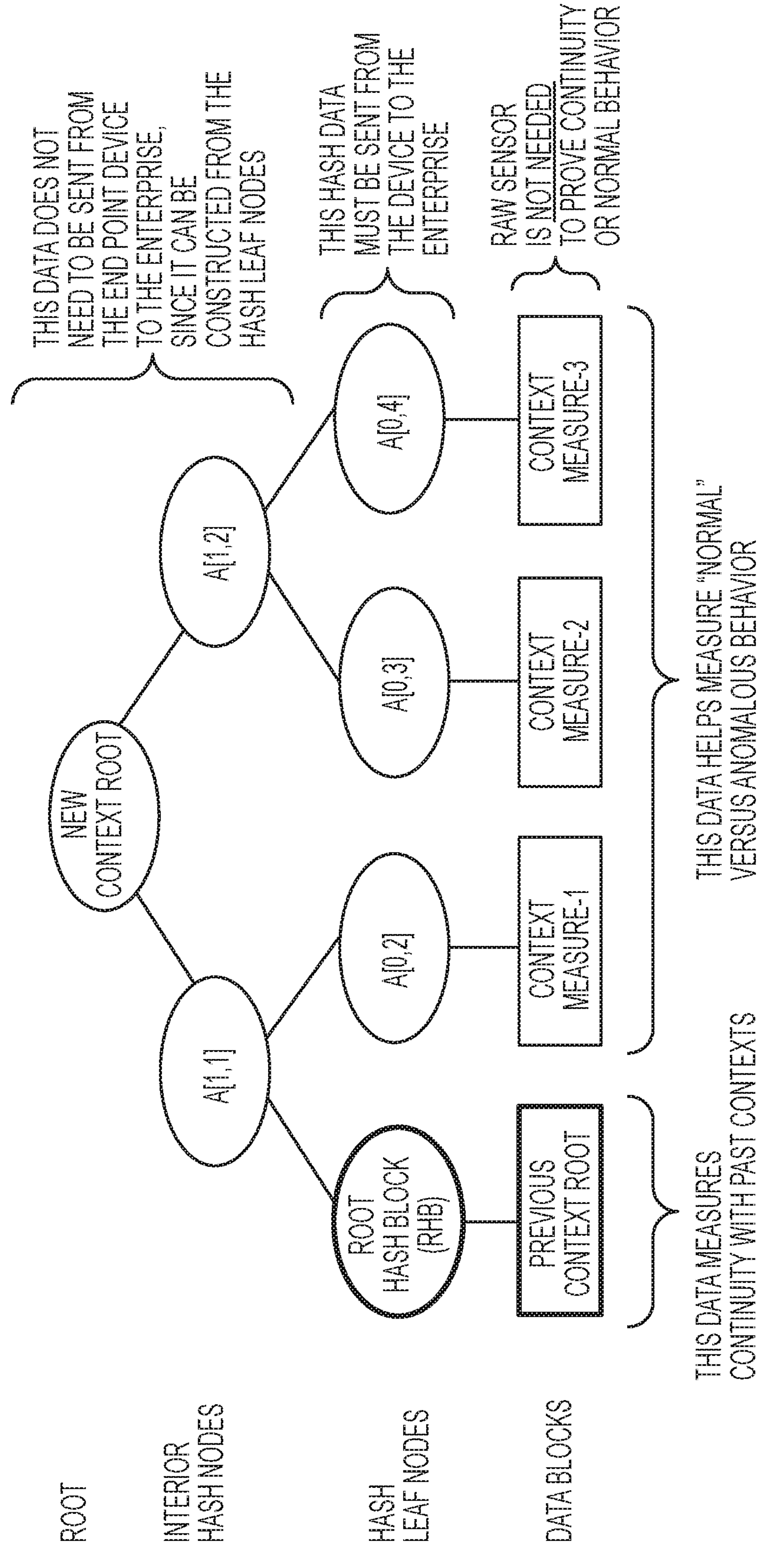
FIG. 16 illustrates a Merkle tree for an end point device that only needs to send hash leaf nodes to the enterprise to establish behavioral continuity according to an embodiment of the present disclosure.

FIG. 16 illustrates a Merkle tree for an end point device that only needs to send hash leaf nodes to the enterprise to establish behavioral continuity according to an embodiment of the present disclosure.

Referring to FIG. 16, the hash of the data block containing the root of the previous hash tree is special and will be referred to as the "root hash block" or "RHB."

The RHB provides immediate evidence of context continuity extending back to the initial use of the device. If the historical root hash is missing, or not computable, then there is a discontinuity in context that needs to be investigated. One possibility is that an authentic user has logged in with a new device that has no knowledge of the user's prior context. Another possibility is that the user is somehow being spoofed, and additional security challenge questions may be required to establish trust. The special status of the RHB must be taken into account when computing risk scores. In the FIG. 11 example, the score can be computed as follows:

Let RC=The match value of RHB computed by the enterprise compared to the value sent by the end point device. If they match, then RC=1; otherwise RC=0.

Using previous notation:

$$Rm = RC * \sum_{I=1}^{n} w_i * X_i$$

And the enterprise will allow a connection based on risk score alone if and only if:

$Rm>R_t$

The RHB is not counted as part of the set X1, X2, . . . Xn. Instead, it becomes a Boolean multiplier for the score.

The enterprise and/or mobile device user may view current and past contextual information as highly confidential. For example, the IP addresses of networks in a classified government facility are highly sensitive. Similarly, the hash value of an unchanging biometric, digital certificate, or security challenge response may be confidential. And yet, these data items could be important elements of context. With CIMA, there is a way to use these confidential elements in measures of conceptual distance without revealing them directly to the (purported) enterprise server as discussed below with respect to FIGS. 17-19.

Figure 17:
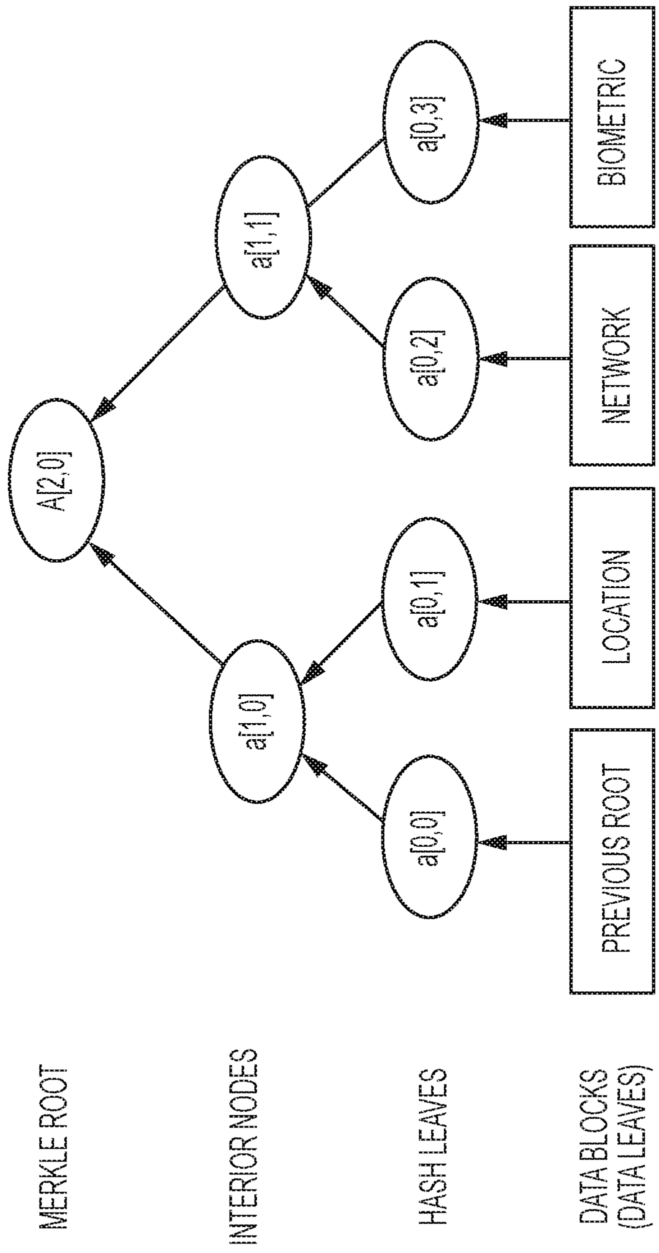
FIGS. 17 to 19 illustrate a way to preserve contextual privacy according to an embodiment of the present disclosure.
Figure 18:
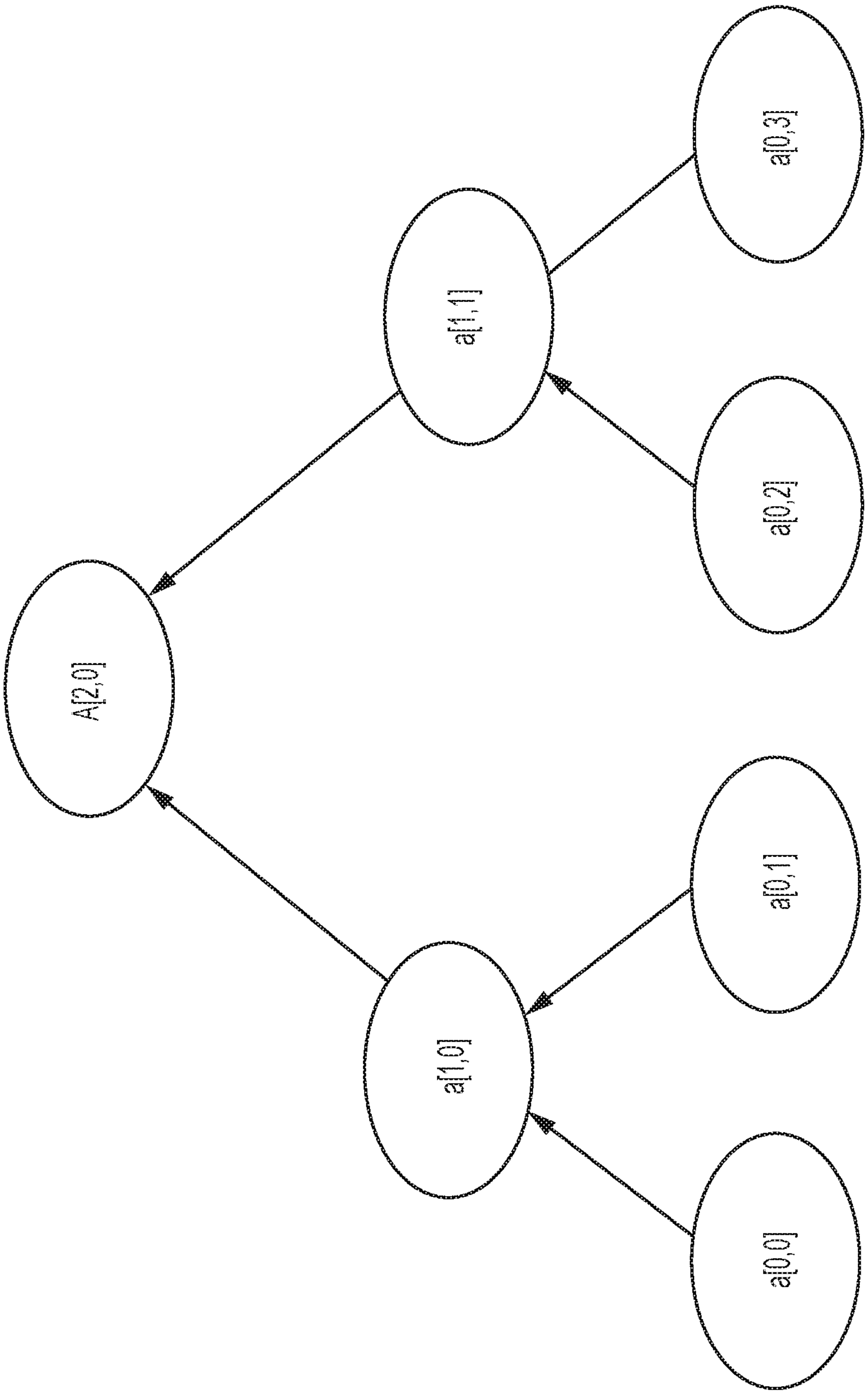
Figure 19:
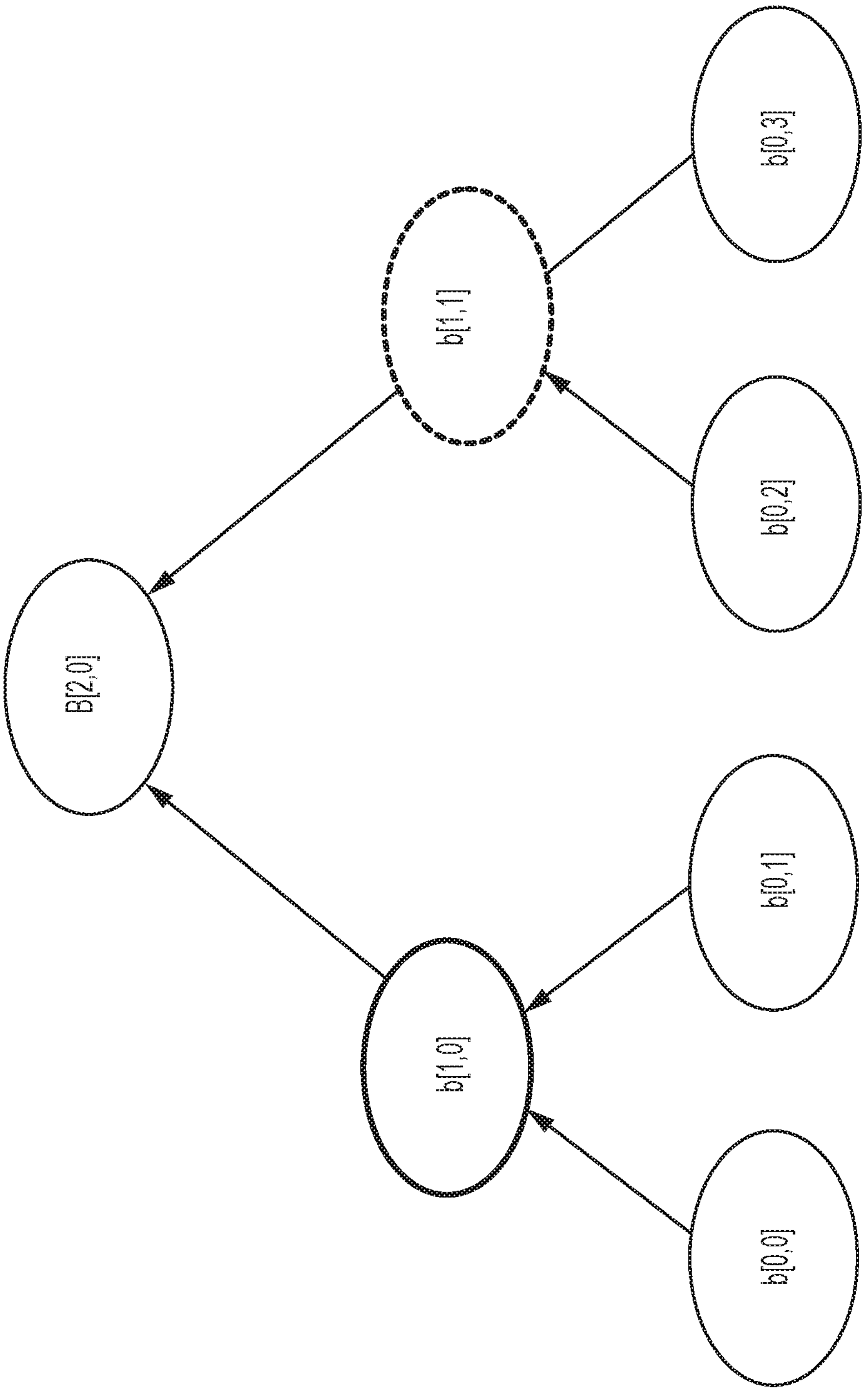

FIGS. 17-19 illustrate a way to preserve contextual privacy according to an embodiment of the present disclosure.

Referring to FIGS. 17-19, at the beginning of a session, the end point device may take a snapshot of the device's context, and may store it in data blocks. These data blocks may include highly sensitive information. Next, the device may construct a Merkle tree from the data blocks. FIG. 17 shows current session hash tree A and data blocks: previous root, location, network and biometric. The end point device may then send information needed to construct hash tree A to the enterprise CIMA server, while omitting all raw data in data blocks as shown in FIG. 18. The end point device (CIMA client) may only send roots a[0,0] to A[2,0]. Based on the information received, the enterprise assesses risk (Rm). If Rm>Rt, it allows the connection. Since one of the leaf nodes in the session tree was a hash of a prior Merkle root, the enterprise returns interior nodes b[1,0] and b[1,1] of the tree that produced that root, as proof of authenticity as shown in FIG. 19.

Figure 20:
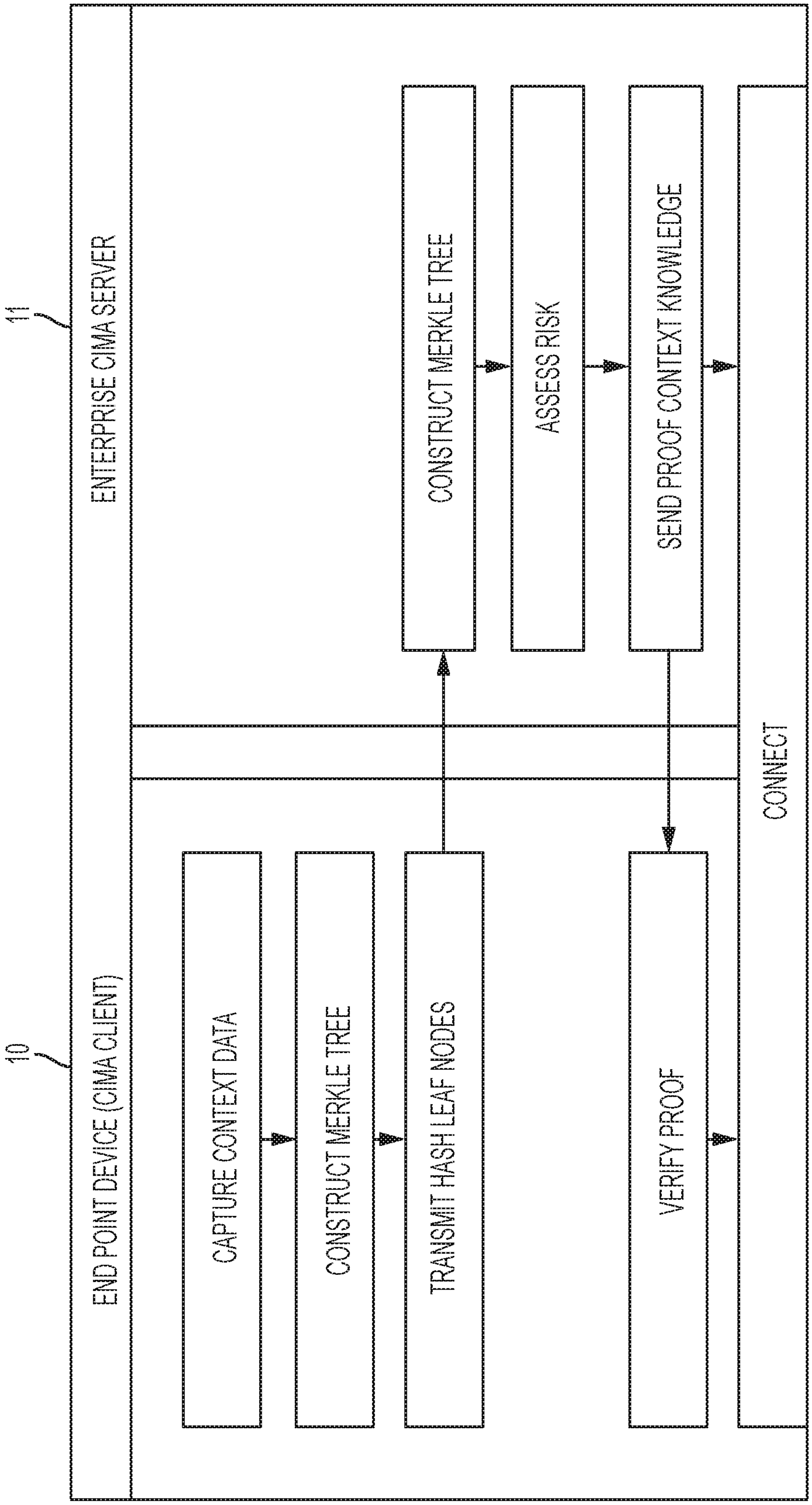
FIG. 20 illustrates risk-based connection decision using a shared secret according to an embodiment of the present disclosure.

FIG. 20 illustrates risk-based connection decision using a shared secret according to an embodiment of the present disclosure.

Referring to FIG. 20, the end point device 10 uses a light-weight algorithm to provide the enterprise server 11 with evidence of authenticity based on current and past context. The enterprise server 11 may compute a risk score based on how well the end point's current context matches previously known contexts for that platform and individual. The fact that the enterprise server 11 can decrypt the EPC message is proof that the end point device is the same as the device that logged into the last session.

The end point device 10 may retain at least two sessions of Merkle Context Trees one for the current session, and one for the previous session. The enterprise server 11 may retain a full database of trees. The computed root hash identifies both the device and the user, and is a Zero-Knowledge proof of identity, with built-in spoofing safeguards. The root hash is a search key for quickly finding the device and user identity, while the leaf node hashes allow rapid search of prior context, enabling calculation of a context-based risk scores.

Referring back to FIG. 13, the EPC processor 35 may decrypt EPC message received from the end point device. The EPS processor 36 may add header to EPS message prior to transmitting the EPS message to the CIMA client.

Figure 21:
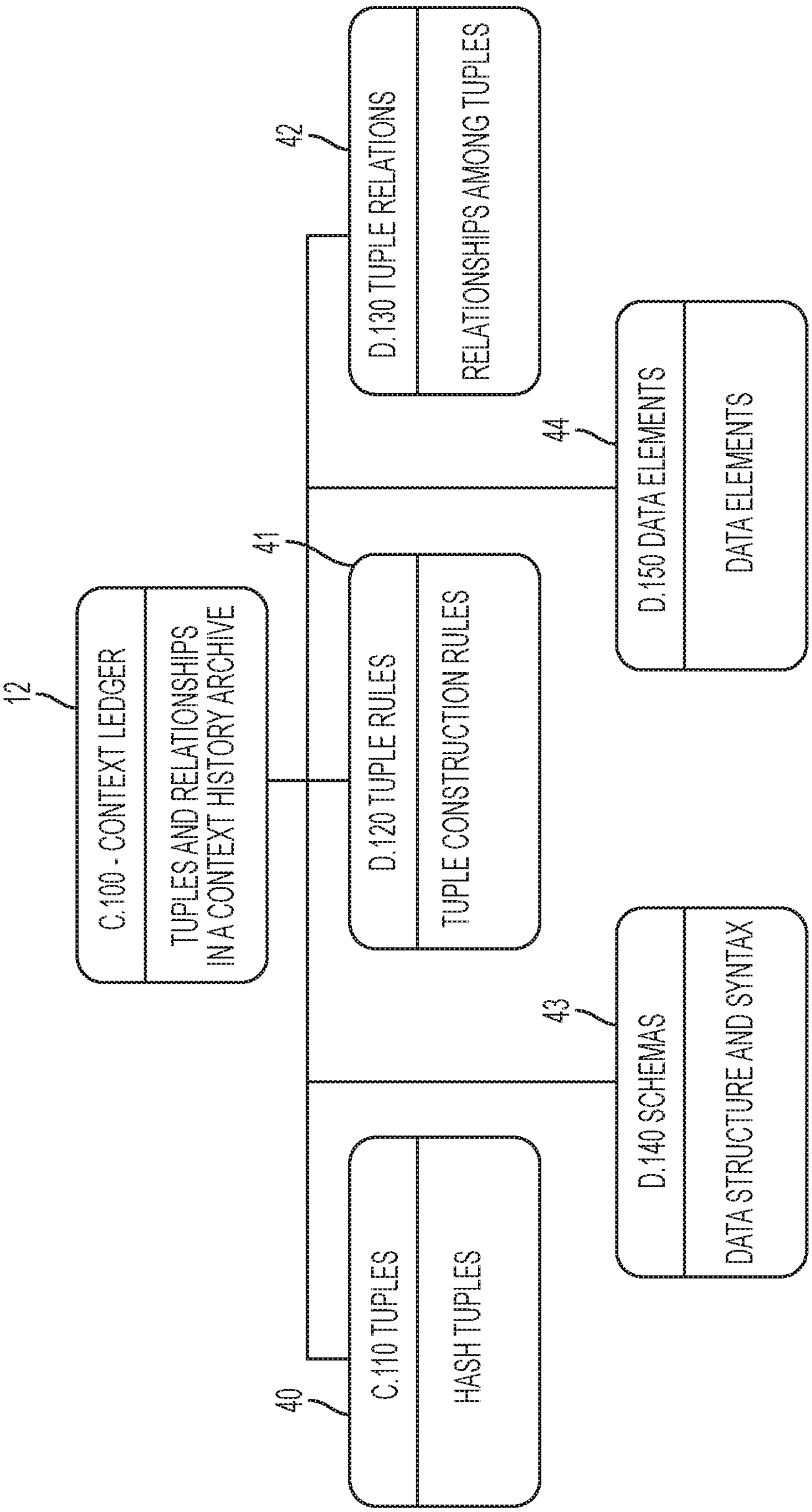
FIG. 21 illustrates CIMA context ledger according to an embodiment of the present disclosure.

FIG. 21 illustrates CIMA context ledger according to an embodiment of the present disclosure.

Referring to FIG. 21, a context ledger may comprise tuples 40, tuple rules 41, tuple relations 42, schemas 43, and data elements 44. The context ledger is a transaction database shared by all nodes participating in a transaction system. The context ledger stores hash tuples (hashed tree nodes), stores tuple schemas that include tuple construction rules such as for constructing Merkle trees, stores relationship among tuples, stores schemas including data structure and syntax and stores data elements.

Figure 22:
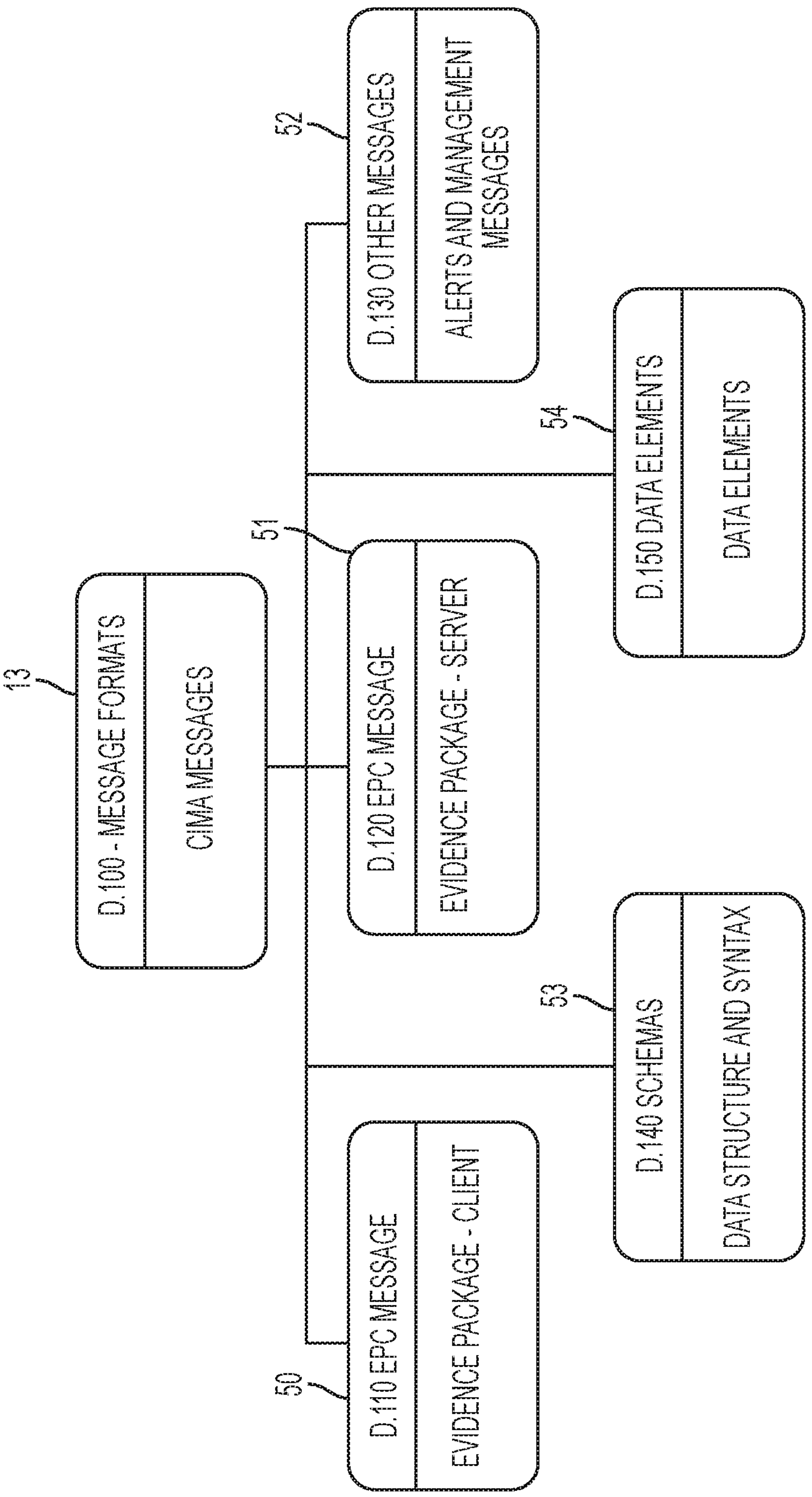
FIG. 22 illustrates CIMA message formats according to an embodiment of the present disclosure.

FIG. 22 illustrates CIMA message formats according to an embodiment of the present disclosure.

Referring to FIG. 22, message format 13 may include an EPC message 50 (FIG. 10), an EPS message 51 (FIG. 14), other messages 52 such as alerts and management messages, schemas 53 and data elements 54. The other messages 52 may include alerts and management messages. The alert and management messages may include context change notification to notify the CIMA server (enterprise server) 11 that context has changed, context termination notification to notify the CIMA server 11 that the context will no longer be reported, context format change to notify the server that the format for EPC will change, context retransmission request where the CIMA client or the CIMA server requests retransmission of last message, context element request where the CIMA server requests status of a specific context element, shared secret request where the CIMA client or the CIMA server request transmission of a hash from last session, evidence package challenge where the CIMA client or the CIMA server requests retransmission of EPC or EPS using a different shared secret, context platform change message where the CIMA client notifies the CIMA server that there is a platform change etc. The schemas 53 may include data structure and syntax.

Figure 23:
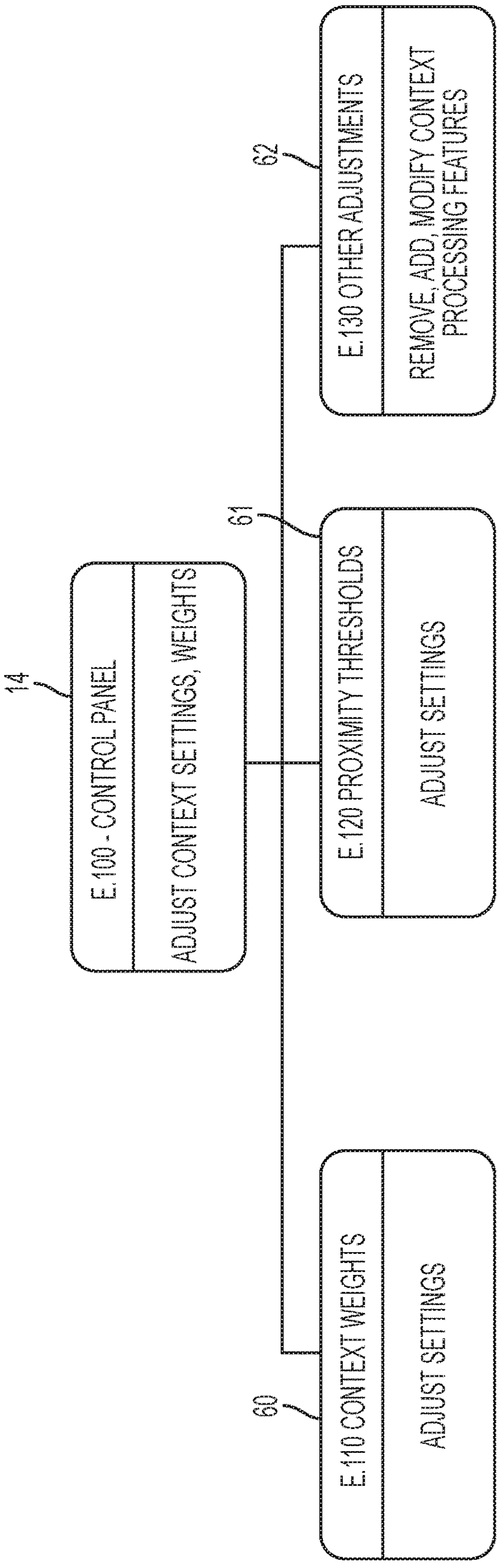
FIG. 23 illustrates a control panel functions according to an embodiment of the present disclosure.

FIG. 23 illustrates a control panel functions according to an embodiment of the present disclosure.

Referring to FIG. 23, a control panel 14 may include a context weights function 60, a proximity thresholds function 61 and other adjustments function 62. The context weights function of the control panel 14 allows a network operator to assign different weights to each data block. For example, a biometric data block may be viewed as more critical than a date-time data block. The proximity thresholds function of the control panel 14 allows a network operator to set the threshold value for allowable risk above which the enterprise will allow a connection. For example, how "close" the current context is to a previously known context. The other adjustments function 62 may remove, add, or modify context processing features.

Figure 24:
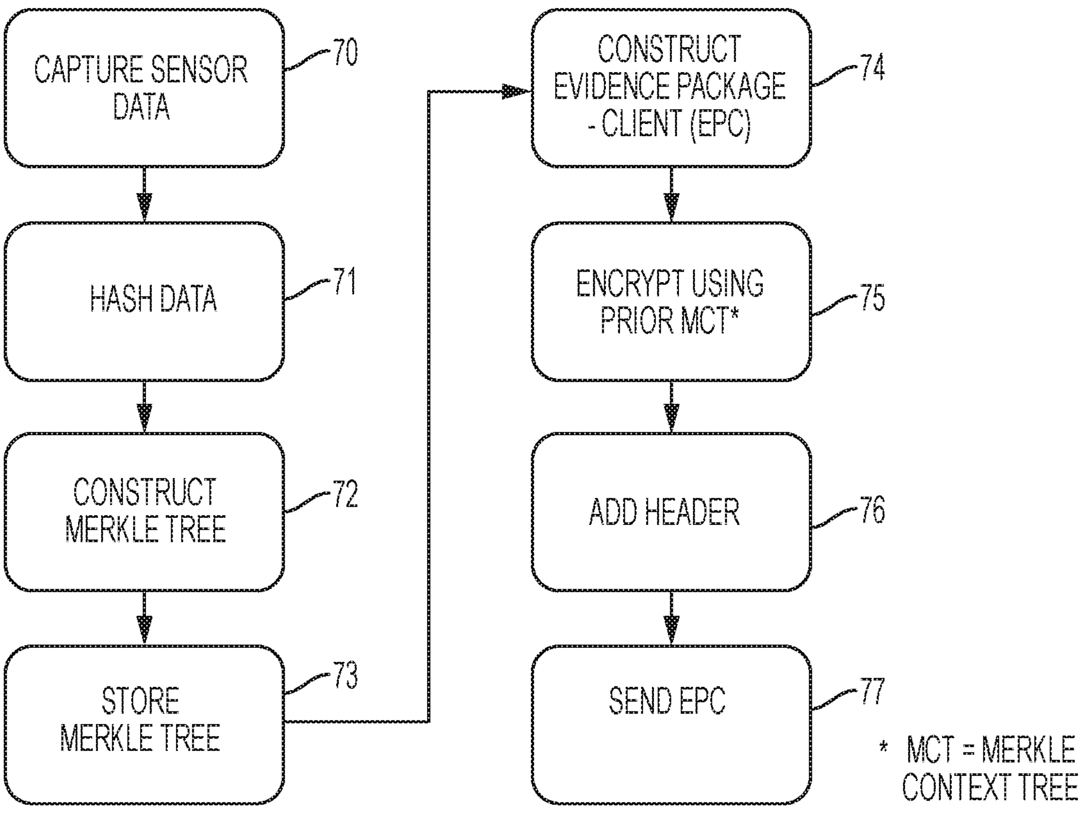
FIG. 24 illustrates a flow diagram for a client session setup according to an embodiment of the present disclosure.

FIG. 24 illustrates a flow diagram for a client session setup according to an embodiment of the present disclosure.

Referring to FIG. 24, once the mobile device 100 (CIMA client) initiates a connection request to the enterprise server 200 (CIMA server), the mobile device may sample context sensors and captures sensor data at operation 70. At operations 71 and 72, the mobile device may generate a UCR by hashing the sensor data and constructing Merkle context tree in the manner described in FIG. 5. At operation 73, the mobile device 100 may store the Merkle context tree in the archive 22. At operation 74, the mobile device 100 may construct an EPC message by using the process described in FIG. 12. At operation 75, the EPC message may be encrypted using a prior Merkle context tree as in FIG. 12. At operation 76, the mobile device 100 may add header to the EPC message prior to sending the EPC message to the enterprise server 200 at operation 77.

Figure 25:
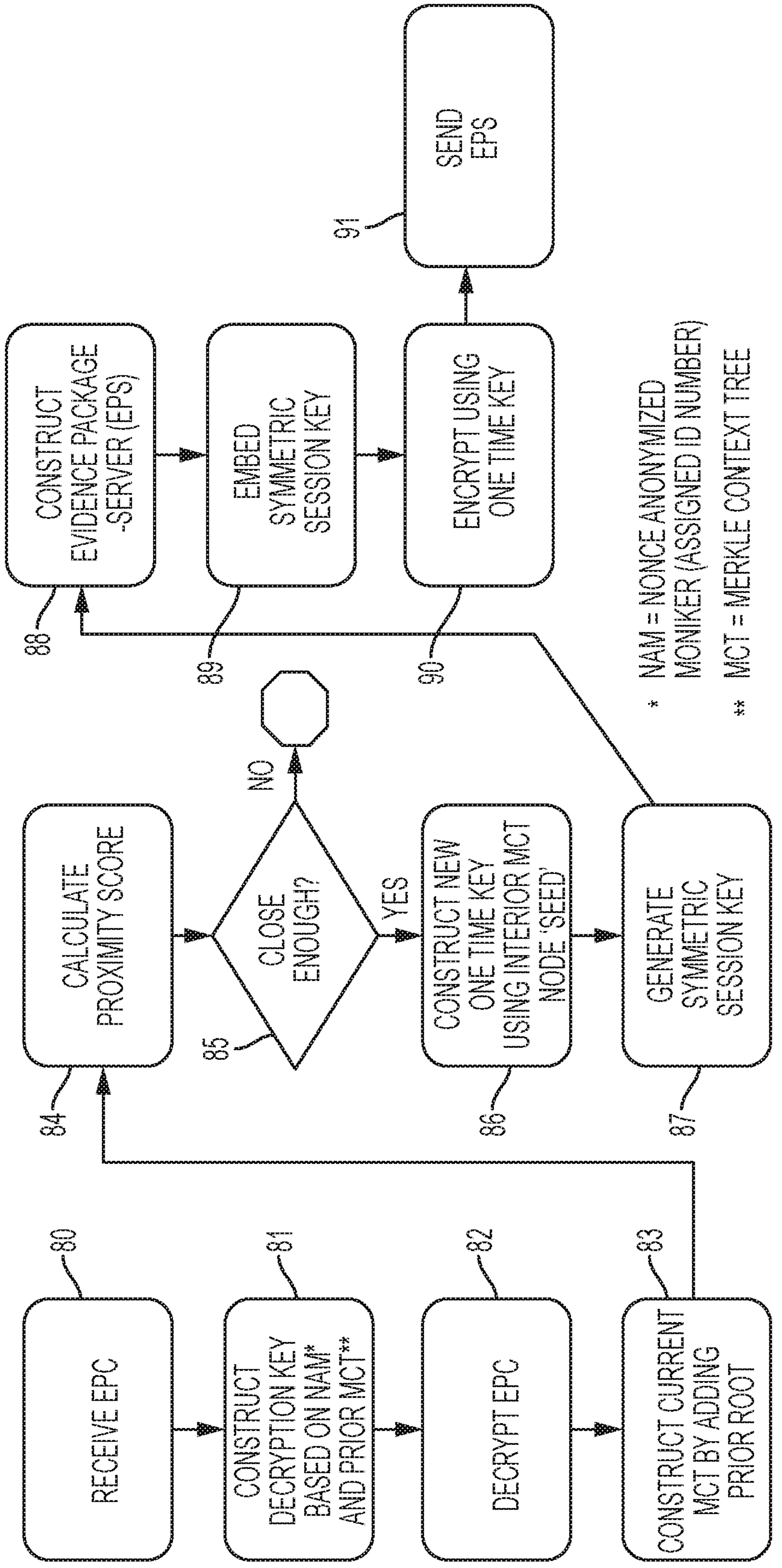
FIG. 25 illustrates a flow diagram for a server authentication and setup according to an embodiment of the present disclosure.

FIG. 25 illustrates a flow diagram for a server authentication and setup according to an embodiment of the present disclosure.

Referring to FIG. 25, an enterprise server 200 may receive an EPC message from a mobile device 100 at operation 80. At operations 81, 82 and 83, the message handler of the enterprise server constructs a decryption key based on nonce anonymized moniker (assigned ID) and prior Merkle tree, decrypts the EPC message and construct current Merkle tree by adding a prior root. At operation 84, the enterprise server may calculate a proximity score. At operation 85, the enterprise server may determine whether the proximity score is close enough. For example, a proximity score may be close enough if the proximity score is greater than a threshold value for allowable risk. If it is determined that the proximity score is not close enough, the enterprise server denies the connection to the mobile device. If it is determined that the connection is close enough, the enterprise server may construct a new one-time key using interior Merkle tree node ("seed") in operation 86 and generates a symmetric session key in operation 87. At operation 88, the enterprise server constructs a EPS message as described in FIG. 14B.

At operation 89, the enterprise server may embed a symmetric session key in the payload of the EPS message. In one embodiment, the one-time symmetric session key may simply be the concatenation of hash leaf nodes associated with the session.

At operation 0, the enterprise server may encrypt the EPS message using one-time key. At operation 91, the enterprise server may send the EPS message as a proof of its authenticity to the mobile device.

Figure 26:
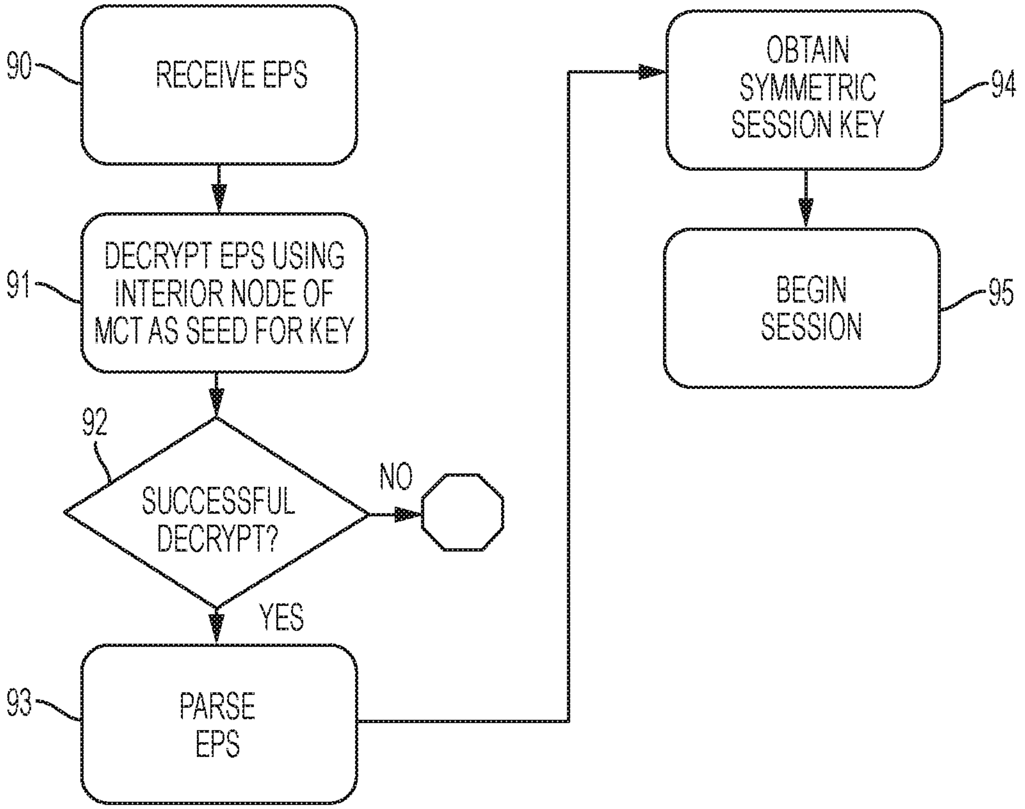
FIG. 26 illustrates a flow diagram session initiation for a CIMA client according to an embodiment of the present disclosure.

FIG. 26 illustrates a flow diagram session initiation for a CIMA client according to an embodiment of the present disclosure.

Referring to FIG. 26, at operation 90, the mobile device 100 (CIMA client) may receive an EPS message from the enterprise server 200 (CIMA server). At operation 91, the mobile device may decrypt EPS using interior node as seed for key. If the enterprise server is able to decrypt the EPS message payload based on the interior node at operation 92, then the mobile device has a proof of authenticity of the enterprise server. The mobile device parses the EPS message in operation 93, obtains symmetric session key in operation 94 and begins session in operation 95. If the enterprise server is not able to decrypt the EPS message payload based on the interior node at operation 92, then the session initiation with the enterprise server is terminated.

Figure 27:
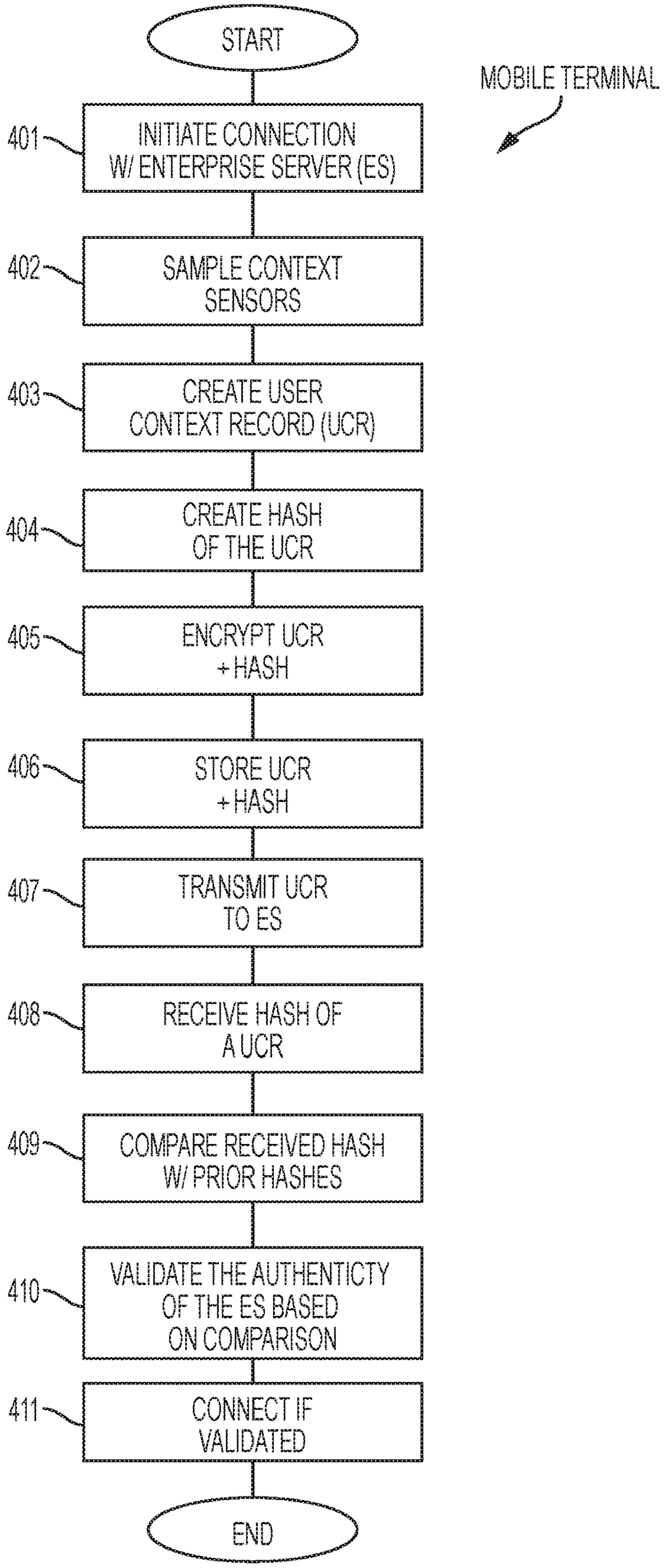
FIG. 27 illustrates a flow chart for a two-way authentication process between a mobile device and an enterprise server from the perspective of the mobile device according to an embodiment of the present disclosure.

FIG. 27 illustrates of a flow chart for a two-way authentication process between a mobile device and an enterprise server from the perspective of the mobile device according to an embodiment of the present disclosure.

Referring to FIG. 4, a flow chart illustrates mobile perspective of two-way risk assessment of User-to-Enterprise and Enterprise-to-User based on current and past user context measurements. The enterprise server 200 validates the mobile device 100 based on a risk score, and the mobile device 100 validates the authenticity of the enterprise server 200 based on one-time receipt of information about a prior connection.

At operation 401, a mobile device 100 initiates a connection with the enterprise server 200. Once the mobile device 100 initiates a connection request to the enterprise server 200, the mobile device samples context sensors at operation 402 and creates a UCR at operation 403. The context record may include biometric measures, location factors, network factors, software state, motion or time or any combination(s) thereof.

The mobile device 100 creates and encrypts a hash of the UCR at operations 404 and 405 respectively. At operation 406, the mobile device stores UCR plus hash in a context ledger.

At operation 407, the mobile device 100 packages and sends context data in a UCR to the enterprise server as evidence of authenticity.

At operation 408, the mobile device 100 receives a hash of a prior UCR from the enterprise server as a one-time pre-shared secret (one-time hash of a prior UCR) to confirm the authenticity of the enterprise network.

At operation 409, the mobile device 100 compares the one-time hash of a prior UCR received from the enterprise server 200 and compares with prior hashes. If validated at operation 410, the mobile device 100 connects to the enterprise server 200 at operation 411.

According to various embodiments, a Context integrity Measurement Architecture (CIMA) may use Hamming matrix approach for two-way authentication using context as a shared secret.

In the Hamming matrix approach, end point mobile device (e.g., mobile phone) records sensor data and transforms the data to hashes (e.g., H1, H2, H3, and H4, etc.). The mobile device 100 may then compute and store the Hamming distance between each of the hashes.

A Hamming distance is the number of characters in which two strings (words) differ, measured with the metric of the corresponding alphabet. For example, if X is the string '000' and Y is the string '111', then the Hamming distance is '3', since every character in the two strings is different. If G is the string '101' and H is the string '110', then the Hamming distance is '2', since the second and third characters in the strings are different.

The mobile device may construct a key based on Hamming distances measured in the previous session. The mobile device 100 may use this key to transmit the hashes to the enterprise server 200. If the mobile device 100 and the enterprise server 200 have previously connected, then the RF transceiver 201 may use knowledge of the last session to decrypt the context hashes. If the mobile device 100 and the enterprise server 200 have not previously connected, then they may use a shared method such as connection time and/or application of a pre-shared key. An example of a CIMA option using Hamming matrix approach is discussed in FIGS. 28 to 36.

FIGS. 28 to 36 provide examples of how to construct an UCR; how to compare UCRs through analysis and vector transformation; how to use the transformation to create a proximity-based risk score; and how to decide whether or not to establish a connection with the mobile user based on assessed risk. An example of calculating risk score based a logical multi-factor distance will be described below. It will be understood there are many possible ways to compute a risk score based on conceptual distance and this example is not intended to limit the scope of the present disclosure.

As discussed above, the mobile device builds the UCR based on the sensor data in the ledger manager. The UCR is a data structure that contains sensor information about a user's environment at the time of session initiation. Variables captured by the UCR may be continuous, discrete, or categorical. The sensor data in the ledger may include location (x, y, z), visible networks (N1, N2, N3, . . . Nn), biometrics (B1, B2, B3, . . . Bm), time (date, day of week, time of day), software state (e.g., open apps), and motion (e.g., velocity, acceleration). For example, as shown in table 2 below, if the UCR data structure defines:

TABLE 2

| | |
|---|---|
| LAT | LATITUDE |
| LON | LONGITUDE |
| ELV | ELEVATION |
| N1 | VISIBLE NETWORK-1 |
| B1 | BIOMETRIC-1 |
| D | DAY OF WEEK |
| T | TIME OF DAY, |

then the UCR data structure may be represented as follows:

UCR:={<Lat><Lon><Elv>}
{<N1><N2> . . . <Nn>}
{<B1><B2> . . . <Bm>}
{<D><T>}

In the UCR data structure, the Lat, Lon, Elv may represent continuous variables from GPS, N1, N2 . . . Nn may represent IP addresses of visible network, B B2 . . . Bm may represent normalized biometric readings ranging between 0.00 and 1.00 and corresponding to "degree of match" against a biometric template for the user, D may represent a category of day, such as "Monday", represented as a single digit, 1-7, and T may represent a time of day, such as 16:25 (Hr:Min), ranging between 00:00-23:59.

Figure 28:
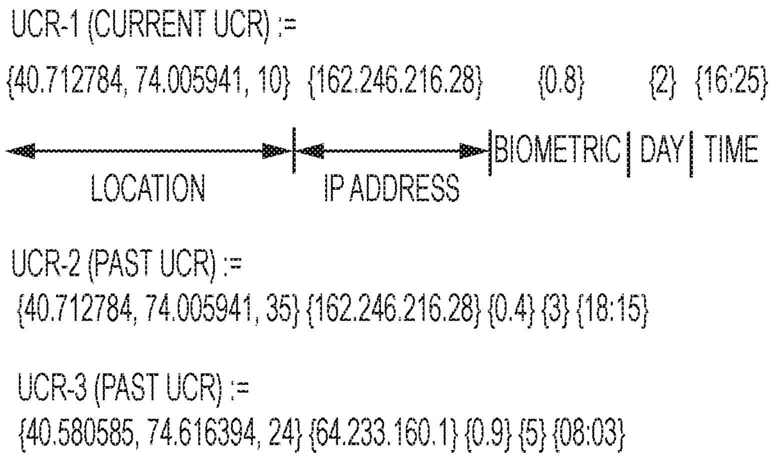
FIG. 28 illustrates an example of UCR comparison according to an embodiment of the present disclosure.

FIG. 28 illustrates an example of UCR comparison according to an embodiment of the present disclosure.

Referring to FIG. 28, the UCR data structure for UCR 1, UCR 2 and UCR 3 each contains location, IP address, biometric measures, day and time.

FIGS. 29A to 29B illustrate an example of UCR, analysis based on geographic distance according to various embodiments of the present disclosure.

Referring to FIGS. 29A and 29B, the matrix in FIG. 29A shows measured geographic distances between UCR. 1 to UCR 2 and UCR 1 to UCR 3. As shown in FIG. 29A, the distance between UCR-1 and itself is always zero. The distances between UCR-1 to UCR-2 and UCR-1 to UCR-3 are 14 meters and 75,317.3 meters, respectively. Next, the enterprise server 200 determines whether distances are within a proximity threshold (e.g., in this case 150 meters); the proximity threshold is adjustable. If the distance is less than the proximity threshold, then the UCR value is transformed to a '0' ('near'); otherwise, it is transformed to a '1' ('far') as shown in FIG. 29B. The transformed UCR values of 0, 0, 1 show that the geographic distance between UCR-1 and UCR-2 is within tolerance, but the distance between UCR-1 and UCR-3 is not.

Figures 30A, 30B:
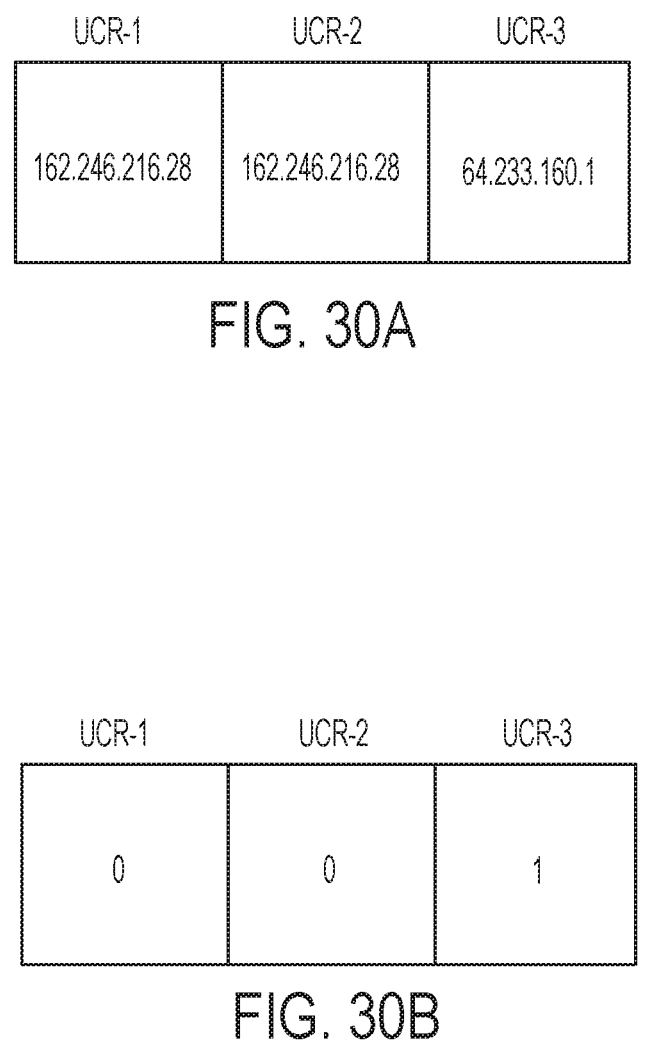

FIGS. 30A to 30B illustrate an example of UCR analysis based on network distance according to various embodiments of the present disclosure.

Referring to FIGS. 30A and 30B, the matrix in FIG. 30A shows the network addresses included in the UCRs of UCR 1, UCR 2 and UCR 3. As shown in FIGS. 30A and 30B, the IP address of UCR 1 is being compared to the IP addresses of UCR 2 and UCR 2. If the IP addresses match, then the UCR value is transformed to a '0' (near); otherwise, then the UCR value is transformed to a '1' ('far'). Since network address of UCR-1 matches with the network address of UCR-2, it is transformed to '0'. However, the network address of UCR-1 does not match with the network address of UCR-3, therefore it is transformed to '1'.

FIGS. 31A to 31B illustrate an example of UCR analysis based on biometric distance according to various embodiments of the present disclosure.

Referring to FIGS. 31A and 31B, the matrix in FIG. 31A shows three match values (0.8, 0.4, 0.9) that would be compared against an absolute standard value, for example, 0.6. The match values represent normalized biometric readings ranging between 0.00 and 1.00 and corresponding to "degree of match" against a biometric template for the user. As shown in FIG. 31B, if the measured biometric is 0.6 or greater, then transform the UCR value in FIG. 31A to a '0' ('near'); otherwise, transform to '1' ('far'). It is noted that in the case of the biometric, matching is done against an absolute standard, perhaps set by the enterprise network, and not against a relative UCR value.

Figures 32A, 32B:
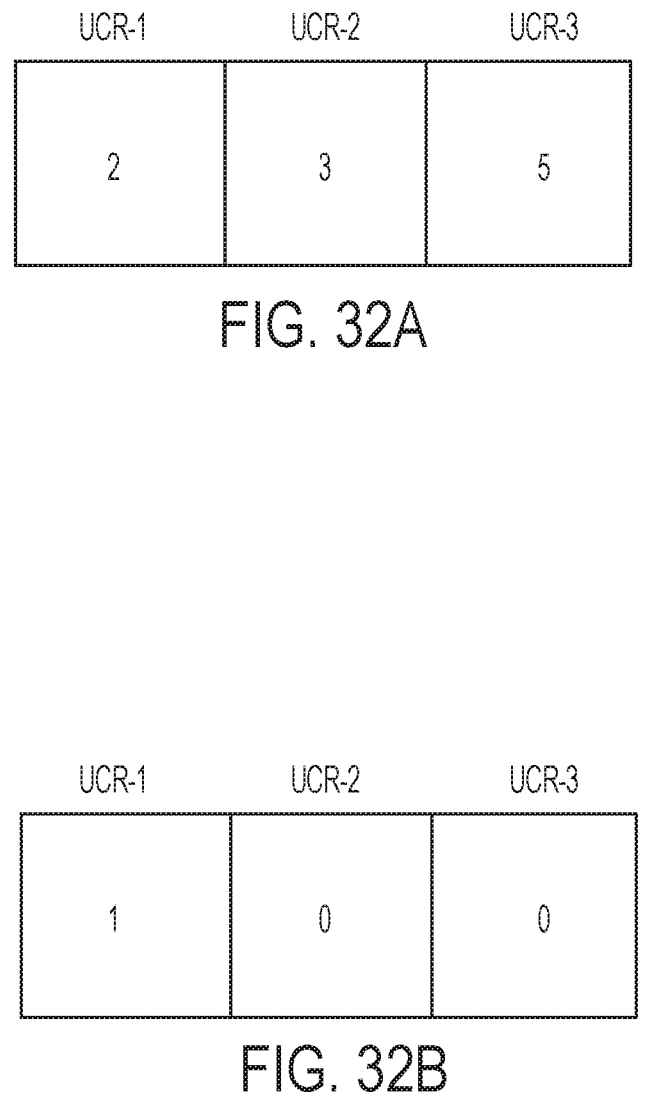

FIGS. 32A to 32B illustrate an example of UCR analysis based on day of the week according to various embodiments of the present disclosure.

Referring to FIGS. 32A and 32B, the matrix in FIG. 32A shows three day values (2=Monday, 3=Tuesday, 5=Thursday based on numbered 1-7, with Sunday being 1). If days 1, 3, and 5 are designated as 'acceptable', but other days are not, then transform the day number to '0' if it is acceptable ('near'), and to '1', otherwise ('far') as shown if FIG. 32B. That is, both UCR-2 and UCR-3 are acceptable, but UCR-1 is not, compared against an absolute standard, perhaps set by the enterprise.

Figure 33A:
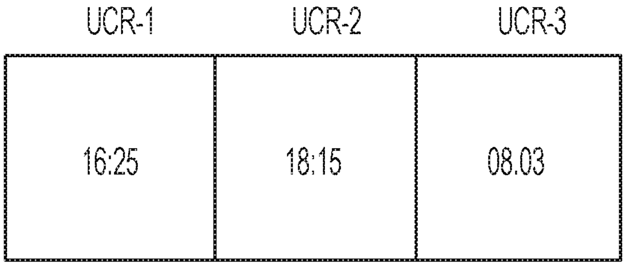
FIGS. 33A to 33B illustrate an example of UCR analysis based on time of the week according to various embodiments of the present disclosure.
Figure 33B:
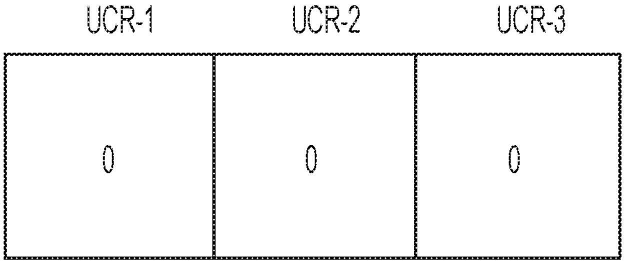

FIGS. 33A to 33B illustrate an example of UCR analysis based on time of the week according to various embodiments of the present disclosure.

Referring to FIGS. 33A and 33B, the matrix in FIG. 33A shows three time values based on time of day ranges between 0 and 23:59 on a 24-hour clock also known as military time. If time between 08:00 and 19:00 is acceptable, but other times are not. Transform the time to '0' if it is acceptable ('near'), and to '1', otherwise ('far'). That is, all are acceptable (near to the absolute standard).

FIGS. 34A to 34B illustrate an example of Hamming distance analysis according to various embodiments of the present disclosure.

Referring to FIGS. 34A and 34B, the matrix in FIG. 34A shows the transformed UCR values from FIGS. 29B, 30B, 31B, 32B and 33B. FIG. 34B shows the Hamming distance between UCR 1 to UCR 2 and UCR 1 to UCR 3. The Hamming distance is a number that denotes a difference between two binary strings. As shown in FIG. 34B, the Hamming Distance 'h' is essentially the number of "bits" or categorical elements that are different. The value of each 'bit' is determined by: 'Match'=0 (near) 'Non-Match'=1 (far). The raw Hamming distance between two binary strings is the sum of the 'match' bits. By this analysis, UCR-1 is closer to UCR-2 (h=2) than to UCR-3 (h=3). Therefore, the UCR-2 is the reference string.

FIG. 35 illustrates an example of weighted score analysis with respect to the closest UCR match according to an embodiment of the present disclosure.

Referring to FIG. 35, an example where weights are applied to each of the transformed UCR values in the reference string UCR-2 (location, biometric, day, time) is shown. For example, weight of 0.5 is applied to the UCR value 0 of the location factor, weight of 0.1 is applied to the UCR value 0 of network factor, weight of 0.2 is applied to the UCR value 1 of biometric factor, weight of 0.1 is applied to the UCR value 1 of day factor and weight of 0.1 is applied to the UCR value 0 of the time factor. The exemplary weights may be set by the enterprise. The weighted risk score is computed with respect to the closest UCR match (in this case, UCR-1 is closer to UCR-2 (h=2) than to UCR-3 (h=3)) by multiplying the weight of each factor with the transformed UCR value of each factor. For example, the total weighted risk score for this is 0.3 in FIG. 35.

According to an embodiment of the invention, if the distance-based risk score from the current UCR to the nearest UCR from a previous valid connection is set to $S_m$ and a maximum threshold distance-based score, beyond which a connection will not be allowed, is set to $S_t$, then the decision rule is that the connection will be allowed if $S_m<S_t$. Otherwise, the connection will be denied.

The mobile device's risk assessment of the enterprise server connection depends on the hash value it receives, which in turn depends on a previous valid connection to the server. It is noted that, during the initial setup, that is, the first time a mobile device connects, there will be no prior UCR. Therefore, the initial connection may use a pre-shared key known by both the server and the platform before the initial setup.

Figure 36:
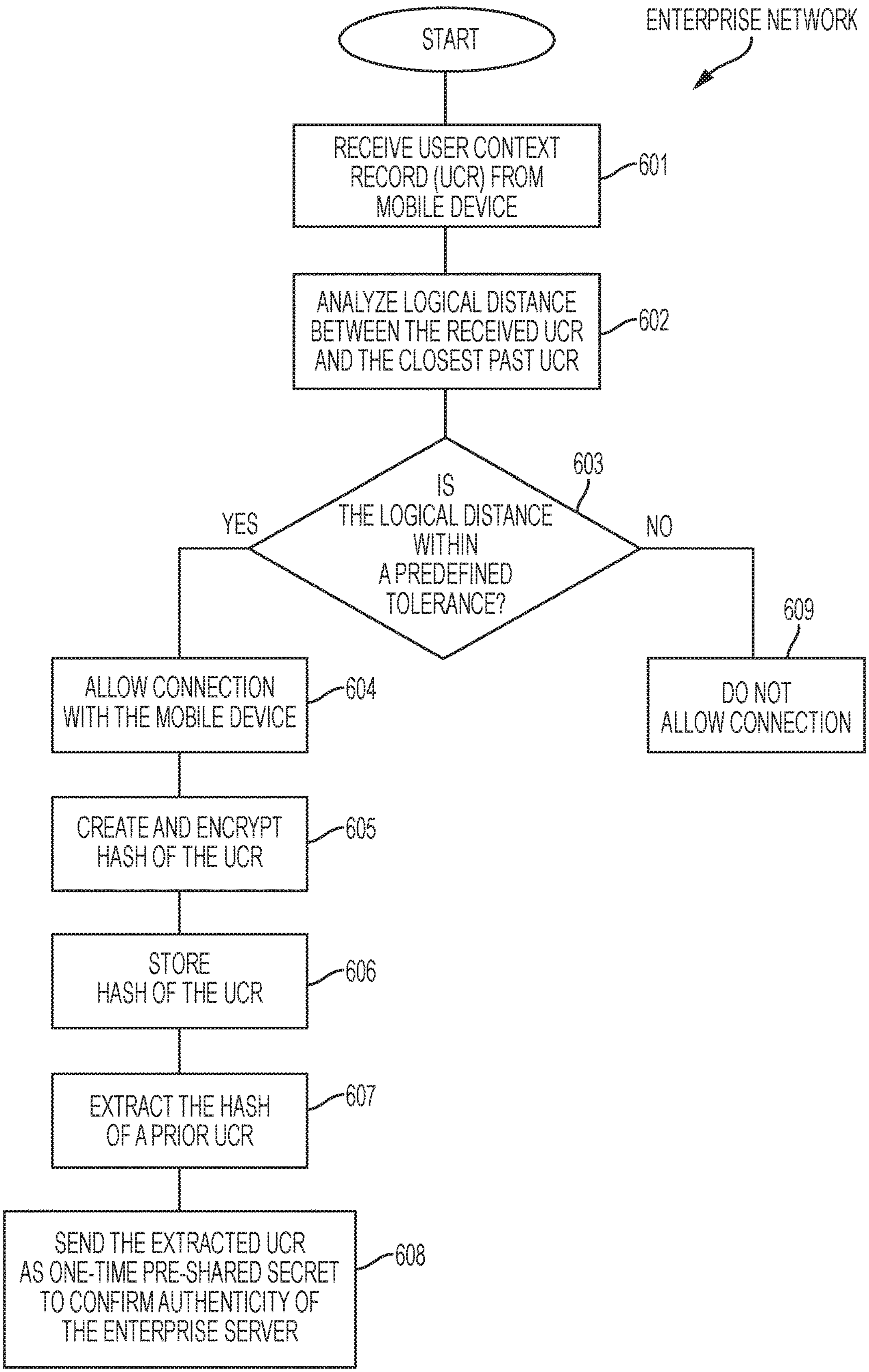
FIG. 36 illustrates a flow chart for a two-way authentication process between a mobile device and an enterprise server from the perspective of the enterprise server according to various embodiments of the present disclosure.

FIG. 36 illustrates a flow chart for a two-way authentication process between a mobile device and an enterprise server from the perspective of the enterprise server according to various embodiments of the present disclosure.

Referring to FIG. 36, a flow chart illustrates the enterprise server's perspective of two-way risk assessment of User-to-Enterprise and Enterprise-to-User based on current and past user context measurements. The Enterprise validates the user based on a risk score, and the User validates the authenticity of the Enterprise server based on one-time receipt of information about a prior connection. More specifically, the enterprise server 200 of FIG. 2 receives the UCR and calculates a risk score for the user based on the logical "distance" between current and past UCRs. If the risk score is acceptable, the enterprise server 200 transmits to the requesting mobile device the hash of a previous UCR, as evidence of authenticity of the enterprise server. This unique hash is only used once.

At operation 601, the enterprise server 200 receives user context record from a mobile platform of the mobile device. At operation 602, the enterprise server 200 analyzes the logical "distance" between the current UCR and the closest past UCR. At operation 603, the enterprise server determines whether the distance is within tolerance. If the distance is not within tolerance, the enterprise server 200 denies the connection at operation 609. If the distance is within tolerance, the enterprise server 200 allows the connection at operation 604.

At operations 605 and 606, the enterprise server 200 creates, encrypts and stores a hash of the UCR where data can be retrieved. Log n times. At operations 607 and 608, the enterprise server 200 extracts the hash of a prior UCR and provides the hash as evidence of authenticity to the mobile platform of the mobile device 100.

The above examples use an algorithmic approach that can be performed on a mobile platform of a mobile device 100. However, because the algorithm produces at the enterprise level a 'ledger' of UCRs, this ledger can be mined by a learning engine such as Numenta™ in order to adjust weights in the risk score calculation. Therefore, the example algorithm can support a future machine learning refinement if there is sufficient marginal value.

Apparatus and method for improving information security are provided.

Airports, sports stadia, shopping malls and fixed locations where crowds gather are ideal, target-rich environments for cyber attackers using man-in-the-middle techniques against mobile devices. Private security enclaves with sensitive data networks are also potential target areas for cyber espionage. Both cellular and Wi-Fi networks may be compromised by false base stations—base stations that appear authentic to the mobile device, but which are really inexpensive, highly portable software defined radios (such as Gnu) or intelligence-grade wiretap capabilities which attract connections based on proximity to targets and resulting signal strength.

The method and apparatus of the present disclosure mitigates this threat from "rogue" base stations by collecting data from and analyzing the local signal environment, then establishing and using location-specific white lists and black lists of base stations. It provides automated white list to devices for cellular base stations and Wireless Access Points in high traffic areas to protect against Man-In-The-Middle attacks.

The method and apparatus of the present disclosure uses location-specific white lists and black lists of base stations for cellular, Wi-Fi and other communications channels to prevent mobile devices from connecting to rogue base stations. The method and apparatus of the present disclosure develops such lists by analyzing the local signal environment.

The method and apparatus of the present disclosure samples the signal environment within an area to determine wireless emitters, then analyzes samples to infer "authentic" versus "rogue" base stations. The method and apparatus of the present disclosure uses the analysis to construct white lists ("authentic" emitters) and black lists ("rogue" emitters) for a specific area.

The areas are probabilistic. An "area" can be loosely defined by geography (either specific collection points or loci of collection points) and by visible wireless networks. The method and apparatus of the present disclosure uses the movement of the user(s) and mobile platform(s) through an area to evaluate the relative position and signal strength of wireless emitters. The method and apparatus of the present disclosure assigns "high risk" to base stations which have duplicate IDs and which, through analysis of position and strength, appear to be lower power. The method and apparatus of the present disclosure assigns "high risk" to base stations which appear to move. The method and apparatus of the present disclosure assigns "high risk" to base stations which have fluctuating power levels independent of distance. The method and apparatus of the present disclosure avoids risky connections and/or notifies the user of the risk. The method and apparatus of the present disclosure can use crowd sourcing of signal sampling and/or analysis rather than single platform collection and/or analysis. The method and apparatus of the present disclosure can use third party information, such as carrier base station white lists, government-supplied white lists, or enterprise-developed white lists to augment its own white list/black list creation.

The method and apparatus of the present disclosure System includes of hardware and software that determine whether or not a mobile platform such as a cell phone, tablet computer, laptop computer, wearable computer, or autonomous robotic computer can connect to a signal source 650 based on assessed risk level.

Figure 37:
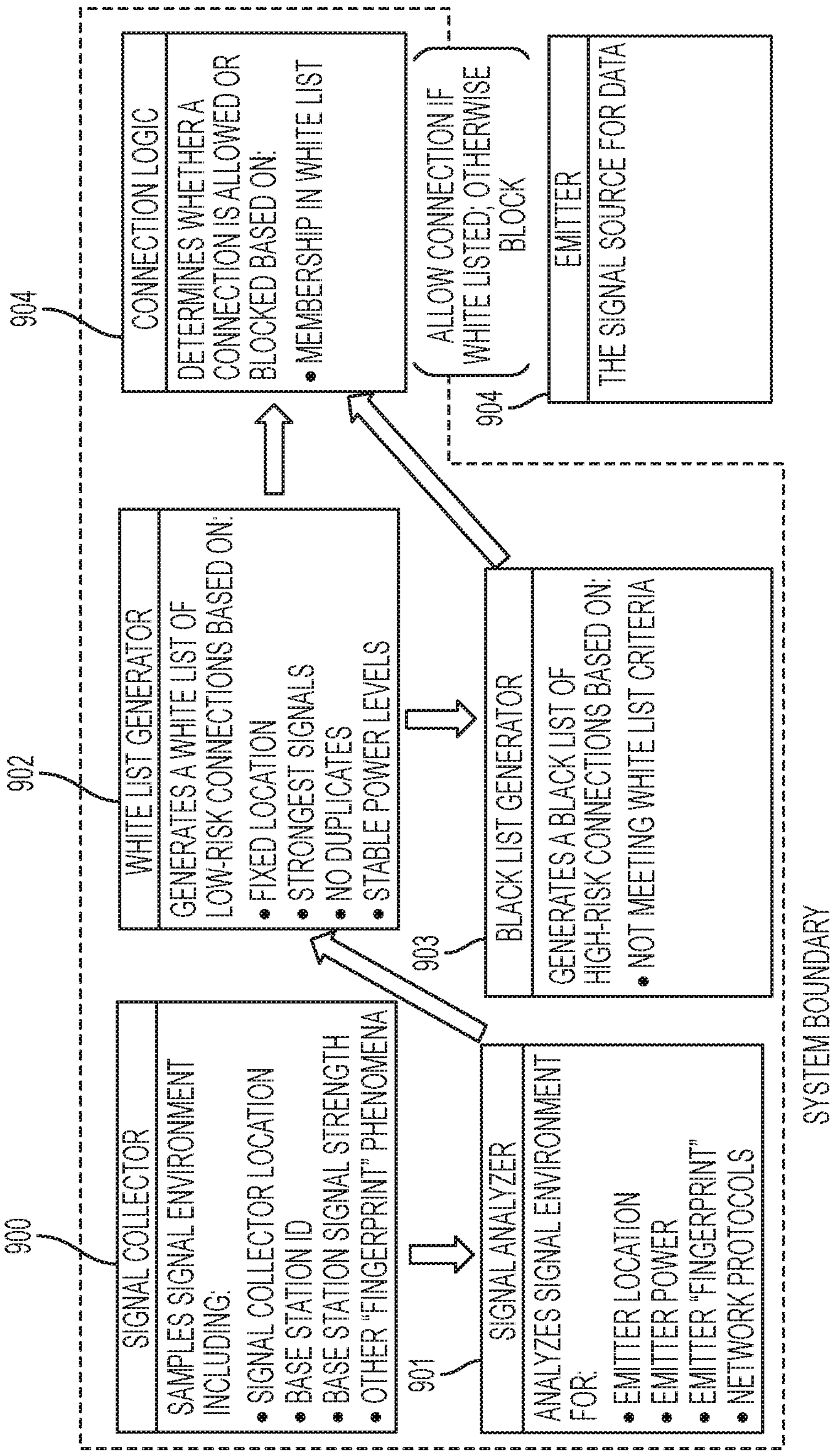
FIG. 37 illustrates an architecture and flow diagram of a method and an apparatus according to an embodiment of the present disclosure.

FIG. 37 illustrates an architecture and flow diagram of a method and an apparatus according to an embodiment of the present disclosure.

Referring to FIG. 37, a method and an apparatus includes of a signal collector 900, signal analyzer 901, white list generator 902, black list generator 903, and connection logic 904. These architectural elements are described below and illustrated in FIG. 37.

The signal collector 900 samples information about the wireless signal environment in a particular area. Collected data includes the geographic coordinates of the signal collector, signal emitters visible at that location, including, but not limited to, cellular base stations and Wi-Fi access points, the measured signal strength of each emitter and other measurable, signal-specific phenomenology.

The signal analyzer 901 analyzes information from one or more signal collectors in order to estimate emitter location, emitter power and unique emitter phenomenology (signal "finger print").

The white list generator 902 creates a "white list" of emitters that are considered low risk for connection, based on fixed locations, strongest power levels, no duplicates and stable power levels.

The black list generator 903 creates a "black list" of emitters that are considered risky connections. This is the list of all emitters that meet the following criteria: moving emitter, or duplicate and weakest signal, or unstable power levels, or any emitter that doesn't make "white list."

The connection logic 904 decides whether to allow or block a connection based on whether the connection is on the white list or black list. The Connection Logic blocks attempts to connect to emitters on the black list.

The signal collector 900 feeds data about the signal environment to the signal analyzer 901. Results of analysis are used by the white list generator 902 and black list generator 903 to create their respective lists of low risk and high risk emitters, and to potentially alert the user and/or enterprise. The connection logic 904 decides to allow or block a connection based on the emitter 904's membership in the white list or black list.

According to an embodiment (Lone platform), an analysis of the signal environment may be performed on the individual moving platform, based on a locus of samples. The user is made aware of risky connections, but may override the blocked connection.

According to an embodiment (Peer-to-Peer), an analysis may be performed by multiple moving platforms that create a common operating picture via peer-to-peer data sharing.

According to an embodiment (Crowd sourcing), an analysis of the signal environment is performed by multiple moving platforms. Devices with The method and apparatus of the present disclosure enabled relay sampled signal data to a cloud-based analytical service which transmits white lists and black lists of base stations to devices, tailored for their location.

According to an embodiment (Fixed sensors), separate fixed sensor boxes and/or PCs are deployed throughout an area to collect, analyze and report potential rogue base stations.

According to an embodiment (Third party), the third party uses white list/black list sourcing from partners.

According to an embodiment (Hybrid model), Devices with The method and apparatus of the present disclosure enabled may use one or more methods of the above embodiments depending on availability of connections and information.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents. Various embodiments of the present disclosure are described as examples only and are not intended to limit the scope of the present disclosure. Accordingly, the scope of the present disclosure should be understood as to include any and all modifications that may be made without departing from the technical spirit of the present disclosure.

What is claimed is:

1. An enterprise server for performing two-way authentication with a mobile device in a network, the enterprise server comprising:
a memory;
a transceiver; and
at least one processor, coupled to the memory, configured to:
receive a user context record (UCR) generated based on one or more sensors of the mobile device;
calculate an authenticity score based on the received UCR;
validate or invalidate an authenticity of the mobile device based on the authenticity score;
upon invalidating the authenticity of the mobile device, deny the mobile device a connection to the network;
upon validating the authenticity of the mobile device, generate a one-time pre-shared secret based on a knowledge of a prior context, the prior context comprising a prior behavioral context; and
control the transceiver to transmit the one-time pre-shared secret to the mobile device for the mobile device to validate an authenticity of the enterprise server based on the transmitted one-time pre-shared secret to perform the two-way authentication,
wherein the authenticity score for validating the mobile device is calculated based on the received UCR and a previously stored UCR that the enterprise server previously received from the mobile device and that comprises the prior behavioral context, and
wherein the one-time pre-shared secret is generated based on the previously stored UCR as an evidence of authenticity of the enterprise server.

2. The enterprise server according to claim 1, wherein the authenticity score is a logical multi-factor distance between the received UCR and the previously stored UCR.

3. The enterprise server according to claim 2, wherein the at least one processor is further configured to:
validate or invalidate the authenticity of the mobile device based on whether the calculated authenticity score meets a predetermined risk threshold;
invalidate the authenticity of the mobile device by determining the calculated authenticity score does not meet the predetermined risk threshold;
validate the authenticity of the mobile device by determining the calculated authenticity score meets the predetermined risk threshold; and
in response to validating the authenticity of the mobile device, allow the mobile device to connect to the network.

4. The enterprise server according to claim 1,
wherein the one-time pre-shared secret transmitted to the mobile device includes a hash value of the previously stored UCR, and
wherein the hash value is sent as a single-use pre-shared secret to confirm the authenticity of the enterprise server.

5. The enterprise server according to claim 1, wherein the received UCR comprises hashed data blocks.

6. The enterprise server according to claim 5,
wherein the hashed data blocks received for an initial session with the enterprise server include a one-time random nonce block, and
wherein the at least one processor is further configured to substitute at least one of a root hash or one or more of interior hash blocks of a prior Merkle context tree to the hashed data blocks received for any subsequent sessions with the enterprise server.

7. The enterprise server according to claim 5, wherein the at least one processor is further configured to:
construct a Merkle context tree based on the hashed data blocks, and
generate hash blocks including interior hash blocks and a root hash of the Merkle context tree.

8. The enterprise server according to claim 7, wherein the at least one processor is further configured to:
calculate the authenticity score based on a degree of match between the constructed Merkle context tree and a prior Merkle context tree, and
allow the connection to the mobile device when the authenticity score based on the degree of match is greater than a threshold value for allowable risk set by the enterprise server.

9. The enterprise server according to claim 7, wherein the one-time pre-shared secret transmitted to the mobile device comprises one or more hash data blocks of a prior Merkle tree transmitted for confirming the authenticity of the enterprise server.

10. A method of an enterprise server for performing two-way authentication with a mobile device in a network, the method comprising:
receiving, by an enterprise server of the network, a user context record (UCR) generated based on one or more sensors of the mobile device when the mobile device initiates a connection request to the network;
calculating, by the enterprise server, an authenticity score based on the received UCR;
validating or invalidating, by the enterprise server, an authenticity of the mobile device based on the authenticity score;
upon invalidating the authenticity of the mobile device, denying the mobile device a connection to the network;
upon validating the authenticity of the mobile device, generating, by the enterprise server, a one-time pre-shared secret based on a knowledge of a prior context, the prior context comprising a prior behavioral context; and
transmitting the one-time pre-shared secret to the mobile device for the mobile device to validate an authenticity of the enterprise server based on the transmitted one-time pre-shared secret to perform the two-way authentication,
wherein the authenticity score for validating the mobile device is calculated based on the received UCR and a previously stored UCR that the enterprise server previously received from the mobile device and that comprises the prior behavioral context, and
wherein the one-time pre-shared secret is generated based on the previously stored UCR as an evidence of authenticity of the enterprise server.

11. The method according to claim 10, wherein the authenticity score is a logical multi-factor distance between the received UCR and the previously stored UCR.

12. The method according to claim 11, further comprising:
validating or invalidating the authenticity of the mobile device based on whether the calculated authenticity score meets a predetermined risk threshold;

invalidating the authenticity of the mobile device by determining the calculated authenticity score does not meet the predetermined risk threshold;

validating the authenticity of the mobile device by determining the calculated authenticity score meets the predetermined risk threshold; and in response to validating the authenticity of the mobile device, allowing the mobile device to connect to the network.

13. The method according to claim 10, wherein the one-time pre-shared secret transmitted to the mobile device includes a hash value of the previously stored UCR, and wherein the hash value is sent only as a single-use pre-shared secret to confirm the authenticity of the enterprise server.

14. The method according to claim 10, wherein the received UCR comprises hashed data blocks.

15. The method according to claim 14, wherein the hashed data blocks for an initial session with the enterprise server include a one-time random nonce block, and wherein the hashed data blocks for subsequent sessions with the enterprise server include at least one of a root hash or one or more of interior hash blocks of a Merkle context tree.

16. The method according to claim 14, further comprising:

constructing a Merkle context tree based on the hashed data blocks, and generating hash blocks including interior hash blocks and a root hash of the Merkle context tree.

17. The method according to claim 16, further comprising:

calculating the authenticity score based on a degree of match between the constructed Merkle context tree and a prior Merkle context tree, and allowing the connection to the mobile device when the authenticity score based on the degree of match is greater than a threshold value for allowable risk set by the enterprise server.

18. The method according to claim 16, wherein the one-time pre-shared secret transmitted to the mobile device comprises one or more hash blocks of a prior Merkle tree for confirming the authenticity of the enterprise server.

19. A mobile device for performing two-way authentication with an enterprise server in a network, the mobile device comprising:

a memory;

one or more sensors; and at least one processor, coupled to the memory, configured to:

initiate a connection request to the enterprise server;

generate a user context record (UCR) based on the one or more sensors when the connection request is initialized;

transmit the UCR to the enterprise server for the enterprise server to validate an authenticity of the mobile device;

receive, as an evidence of authenticity of the enterprise server, a one-time pre-shared secret from the enterprise server when the authenticity of the mobile device is validated, the one-time pre-shared secret being based on a knowledge of a prior context, the prior context comprising a prior behavioral context, the one-time pre-shared secret being based on a previously provided UCR that the mobile device previously transmitted to the enterprise server and that comprises the prior behavioral context; and validate an authenticity of the enterprise server based on the one-time pre-shared secret received to perform the two-way authentication.

20. The mobile device according to claim 19, wherein the one-time pre-shared secret received by the mobile device includes a hash value of the previously provided UCR that the mobile device previously transmitted to the enterprise server and that comprises the prior behavioral context, and wherein the hash value is received only as a one-time pre-shared secret to confirm the authenticity of the enterprise server.

21. The mobile device according to claim 20, wherein the at least one processor is further configured to compare the received hash value with a prior hash value stored in the memory of the mobile device to validate the authenticity of the enterprise server before connecting to the enterprise server.

22. The mobile device according to claim 19, wherein the UCR comprises hashed data blocks.

23. The mobile device according to claim 22, wherein the at least one processor is further configured to:

construct a Merkle context tree based on the hashed data blocks, and generate hash blocks including interior hash blocks and a root hash of the Merkle context tree.

24. A method of a mobile device for performing two-way authentication with an enterprise server in a network, the method comprising:

initiating a connection request to the enterprise server;

generating, by the mobile device, a user context record (UCR) based on one or more sensors of the mobile device when the connection request to the network is initialized;

transmitting, by the mobile device, the UCR to the enterprise server for the enterprise server to validate an authenticity of the mobile device;

receiving, by the mobile device, as an evidence of authenticity of the enterprise server, a one-time pre-shared secret from the enterprise server when the authenticity of the mobile device is validated, the one-time pre-shared secret being based on a knowledge of a prior context, the prior context comprising a prior behavioral context, the one-time pre-shared secret being based on a previously provided UCR that the mobile device previously transmitted to the enterprise server and that comprises the prior behavioral context; and validating, by the mobile device, an authenticity of the enterprise server based on the one-time pre-shared secret received to perform the two-way authentication.

25. The method according to claim 24, wherein the one-time pre-shared secret received by the mobile device includes a hash value of the previously provided UCR that the mobile device previously transmitted to the enterprise server and that comprises the prior behavioral context, and wherein the hash value is received only as a one-time pre-shared secret to confirm the authenticity of the enterprise server.

26. The method according to claim 25, further comprising:

comparing the received hash value with prior hash value stored in a memory of the mobile device to validate the authenticity of the enterprise server before connecting to the enterprise server.

27. The method according to claim 24, wherein the UCR comprises hashed data blocks.

28. The method according to claim 27, further comprising:

constructing a Merkle context tree based on the hashed data blocks, and generating hash blocks including interior hash blocks and a root hash of the Merkle context tree.

* * * * *